United States Patent
Chae et al.

(10) Patent No.: US 11,243,291 B2
(45) Date of Patent: Feb. 8, 2022

(54) METHOD FOR PERFORMING OTDOA-RELATED OPERATION BY TERMINAL IN WIRELESS COMMUNICATION SYSTEM, AND APPARATUS THEREFOR

(71) Applicant: LG Electronics Inc., Seoul (KR)

(72) Inventors: Hyukjin Chae, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/759,174

(22) PCT Filed: Oct. 29, 2018

(86) PCT No.: PCT/KR2018/012932
§ 371 (c)(1),
(2) Date: Apr. 24, 2020

(87) PCT Pub. No.: WO2019/083345
PCT Pub. Date: May 2, 2019

(65) Prior Publication Data
US 2021/0181293 A1 Jun. 17, 2021

Related U.S. Application Data

(60) Provisional application No. 62/577,752, filed on Oct. 27, 2017.

(51) Int. Cl.
*G01S 5/10* (2006.01)
*H04W 4/029* (2018.01)
*G01S 5/02* (2010.01)

(52) U.S. Cl.
CPC .............. *G01S 5/10* (2013.01); *G01S 5/0221* (2013.01); *H04W 4/029* (2018.02)

(58) Field of Classification Search
CPC .............................. H04W 4/029; G01S 5/0221
(Continued)

(56) References Cited

U.S. PATENT DOCUMENTS 9,955,301 B2 * 4/2018 Markhovsky ............. G01S 3/74
10,091,616 B2 * 10/2018 Prevatt ...................... G01S 5/14
(Continued)

FOREIGN PATENT DOCUMENTS

| KR | 100277036 | 1/2001 |
| KR | 1003 98147 | 9/2003 |
| KR | 20140015394 | 2/2014 |

OTHER PUBLICATIONS

PCT International Search Report and Written Opinion in International Application No. PCT/KR2018/012932, dated Feb. 27, 2019, 22 pages (with English translation).

*Primary Examiner* — CongVan Tran
(74) *Attorney, Agent, or Firm* — Fish & Richardson P.C.

(57) ABSTRACT

Disclosed according to various embodiments are a method for performing an observed time difference of arrival (OTDOA)-related operation by a terminal in a wireless communication system, and an apparatus therefor. Disclosed are a method for performing an OTDOA-related operation by a terminal, and an apparatus therefor, the method comprising the steps of: receiving a first positioning signal from a first base station; receiving a second positioning signal from a second base station; measuring a first phase difference between reference signals included in the first positioning signal, and a second phase difference between reference signals included in the second positioning signal; and feeding back, to the first base station, positioning information including the difference value between the first phase difference and the second phase difference.

7 Claims, 27 Drawing Sheets

(58) Field of Classification Search
USPC .................................................. 455/456.1
See application file for complete search history.

(56) References Cited

U.S. PATENT DOCUMENTS

| | | | | |
|---|---|---|---|---|
| 10,117,218 | B2* | 10/2018 | Markhovsky | G01S 5/14 |
| 10,142,004 | B2* | 11/2018 | Park | H04L 25/03343 |
| 10,746,842 | B2* | 8/2020 | Kim | G01S 13/84 |
| 10,966,174 | B2* | 3/2021 | Beale | H04L 27/2663 |
| 2010/0317351 | A1* | 12/2010 | Gerstenberger | H04W 8/26 |
| | | | | 455/443 |
| 2011/0039578 | A1* | 2/2011 | Rowitch | G01S 5/0236 |
| | | | | 455/456.1 |
| 2012/0122478 | A1* | 5/2012 | Siomina | H04W 64/00 |
| | | | | 455/456.1 |
| 2012/0122485 | A1 | 5/2012 | Bartlett | |
| 2015/0006073 | A1 | 1/2015 | Moshfeghi | |
| 2016/0307328 | A1* | 10/2016 | Moeglein | G01S 5/0263 |

* cited by examiner

FIG. 5
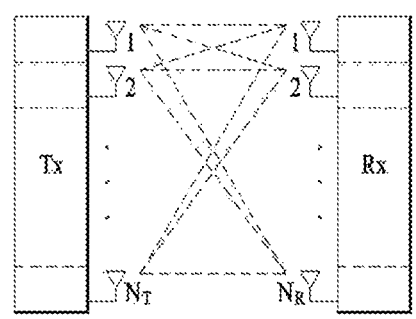
(a)
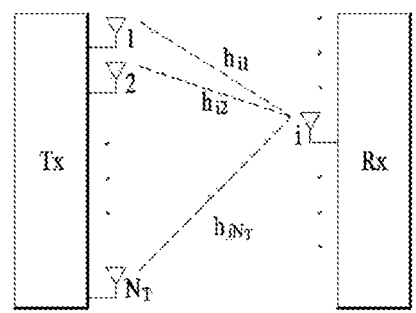
(b)

FIG. 8
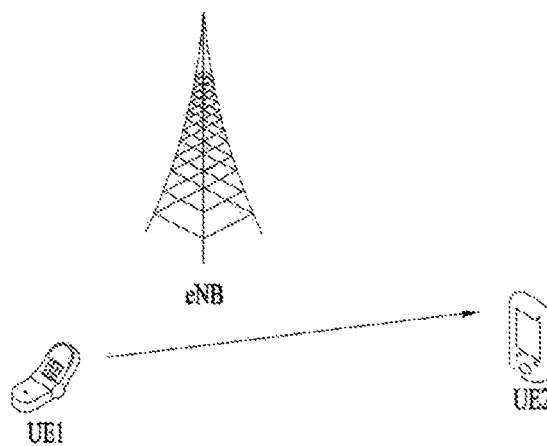
(a)
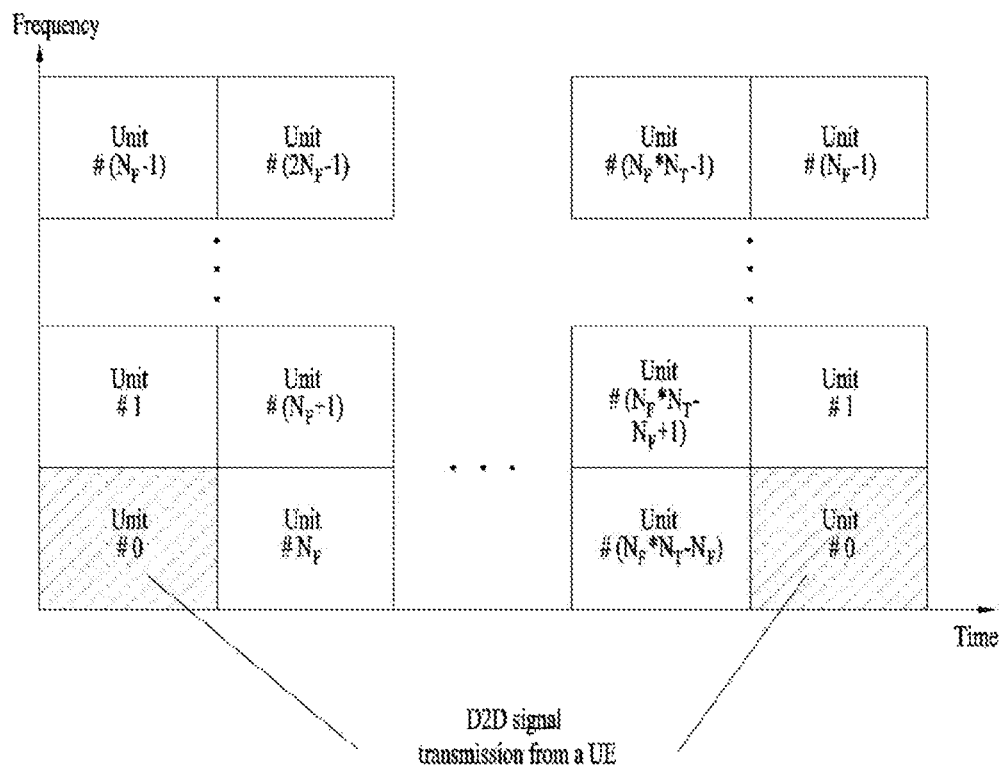
(b)

FIG. 9
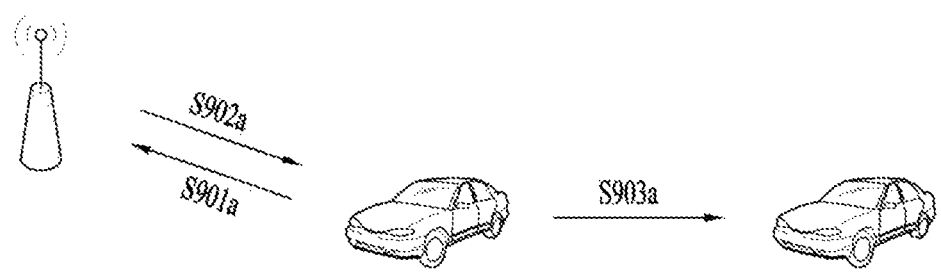
(a)
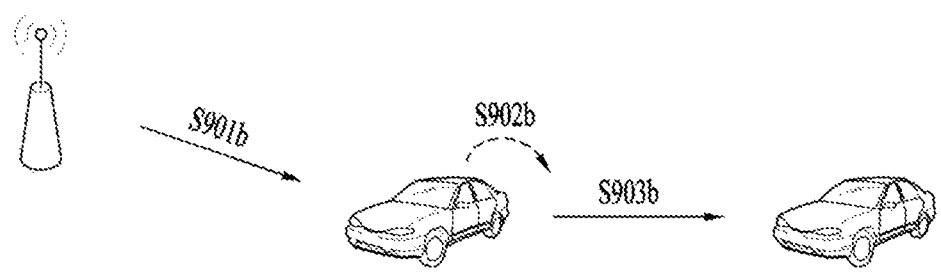
(b)

FIG. 14
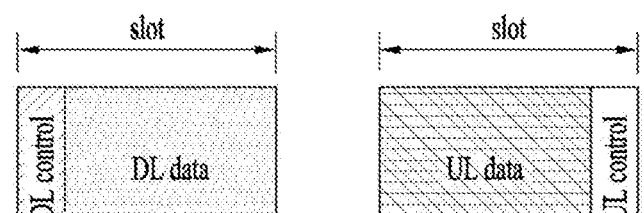
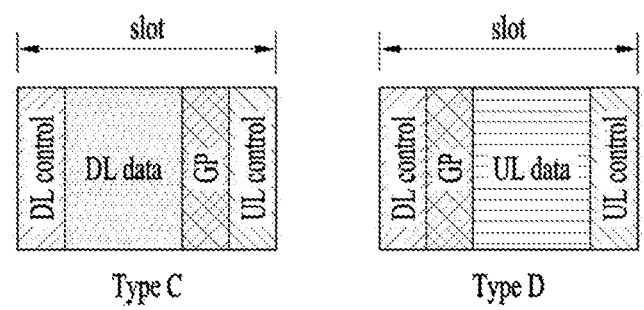

FIG. 16
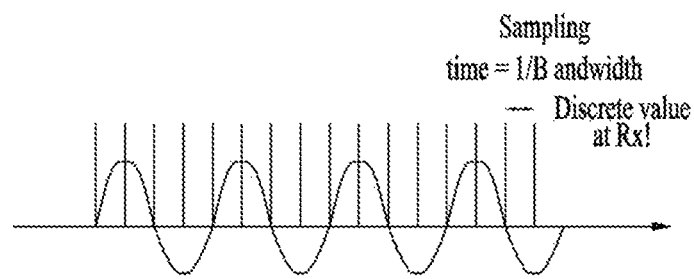
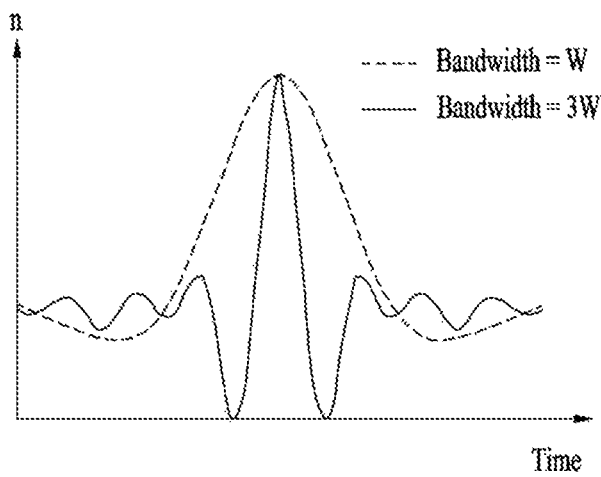

METHOD FOR PERFORMING OTDOA-RELATED OPERATION BY TERMINAL IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2018/012932, filed on Oct. 29, 2018, which claims the benefit of U.S. Provisional Application No. 62/577,752, filed on Oct. 27, 2017. The disclosures of the prior applications are incorporated by reference in their entirety.

TECHNICAL FIELD

The present disclosure relates to a method of performing an operation related to observed time difference of arrival (OTDOA) by a terminal in a wireless communication system and apparatus therefor, and more particularly, to a method of feeding back positioning information including phase difference information corresponding to a reference signal time difference (RSTD) and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present disclosure is to provide a method by which a user equipment (UE) measures phase differences between reference signals in positioning signals transmitted from two base stations and feed back to a base station positioning information including a difference between the phase differences measured for the base stations, whereby the base station or a network may estimate or measure the location of the UE more accurately based on observed time difference of arrival (OTDOA).

Another object of the present disclosure is to provide a method by which a UE transmits to a base station positioning information including a difference between phase differences rather than time information on a reference signal time difference (RSTD), thereby improving noise robustness and minimizing quantization errors.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of performing an operation related to observed time difference of arrival (OTDOA) by a user equipment (UE) in a wireless communication system. The method may include receiving a first positioning signal from a first base station, receiving a second positioning signal from a second base station, measuring a first phase difference between reference signals included in the first positioning signal and a second phase difference between reference signals included in the second positioning signal, and feeding back positioning information including a difference between the first and second phase differences to the first base station.

Alternatively, the first and second phase differences may be respectively measured from reference signals mapped to two tones with the same frequency interval.

Alternatively, the first base station may obtain information corresponding to a reference signal time difference (RSTD) at the UE from the difference included in the positioning information.

Alternatively, the UE may determine whether to apply a predetermined scale value to the difference based on the magnitude of the difference.

Alternatively, the difference included in the positioning information may be quantized with N bits.

Alternatively, the UE may transmit a reference signal phase-rotated by a magnitude of the difference to the first base station to feed back the positioning information.

Alternatively, each of the first and second positioning signals may include reference signals mapped to at least two tones with a predetermined first frequency interval.

Alternatively, the predetermined first frequency interval may be determined by a location server for estimating the location of the UE.

Alternatively, the location server may determine the first frequency interval by considering at least one of the selectivity of a channel carrying the first positioning signal or the selectivity of a channel carrying the second positioning signal.

In another aspect of the present disclosure, provided herein is a method of feeding back positioning information related to OTDOA by a UE in a wireless communication system. The method may include receiving a first positioning signal and a second positioning signal, each of which includes first reference signals mapped to two tones with a first frequency interval, measuring a first phase difference between the first reference signals included in the first positioning signal and a second phase difference between the first reference signals included in the second positioning signal, and feeding back to a base station the positioning information including a first difference between the measured first and second phase differences.

Alternatively, each of the first and second positioning signals may further include second reference signals mapped to two tones with a second frequency interval. In this case, the second frequency interval may be greater than the first frequency interval.

Alternatively, the UE may measure a second difference from the second reference signals according to an instruction from a location server for estimating the location of the UE and transmit the positioning information further including the measured second difference. The second difference may be a difference between a phase difference between the second reference signals included in the first positioning signal and a phase difference between the second reference signals included in the second positioning signal.

Alternatively, the location server may determine and instruct the UE whether to measure the second difference based on the states of channels carrying the first and second positioning signals.

Alternatively, the location server may estimate the location of the UE based on the first difference and adjust the estimated location of the UE based on the second difference. In some implementations of the present disclosure, the processor may be configured to receive a user input to switch the drive mode from an autonomous mode to a manual mode, or to switch from a manual mode to an autonomous mode.

Advantageous Effects

According to the present disclosure, a user equipment (UE) measures phase differences between reference signals in positioning signals transmitted from two base stations and feeds back to a base station positioning information including a difference between the phase differences measured for the base stations, whereby the base station or a network may estimate or measure the location of the UE more accurately based on observed time difference of arrival (OTDOA)

According to the present disclosure, a UE transmits to a base station positioning information including a difference between phase differences rather than time information on a reference signal time difference (RSTD), thereby providing the base station or a network RSTD-related information that is robust to noise and capable of minimizing quantization errors.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 5 is a view illustrating the configuration of a wireless communication system having multiple antennas;

FIG. 8 is a view illustrating an exemplary D2D resource pool for D2D communication;

FIG. 9 is a view referred to for describing transmission modes and scheduling schemes for vehicle-to-everything (V2X);

FIGS. 13 and 14 are views illustrating a new radio access technology (NRAT) frame structure;

FIG. 16 is a conceptual diagram illustrating a method of measuring a distance based on correlation in the time domain;

BEST MODE

Figure 1:
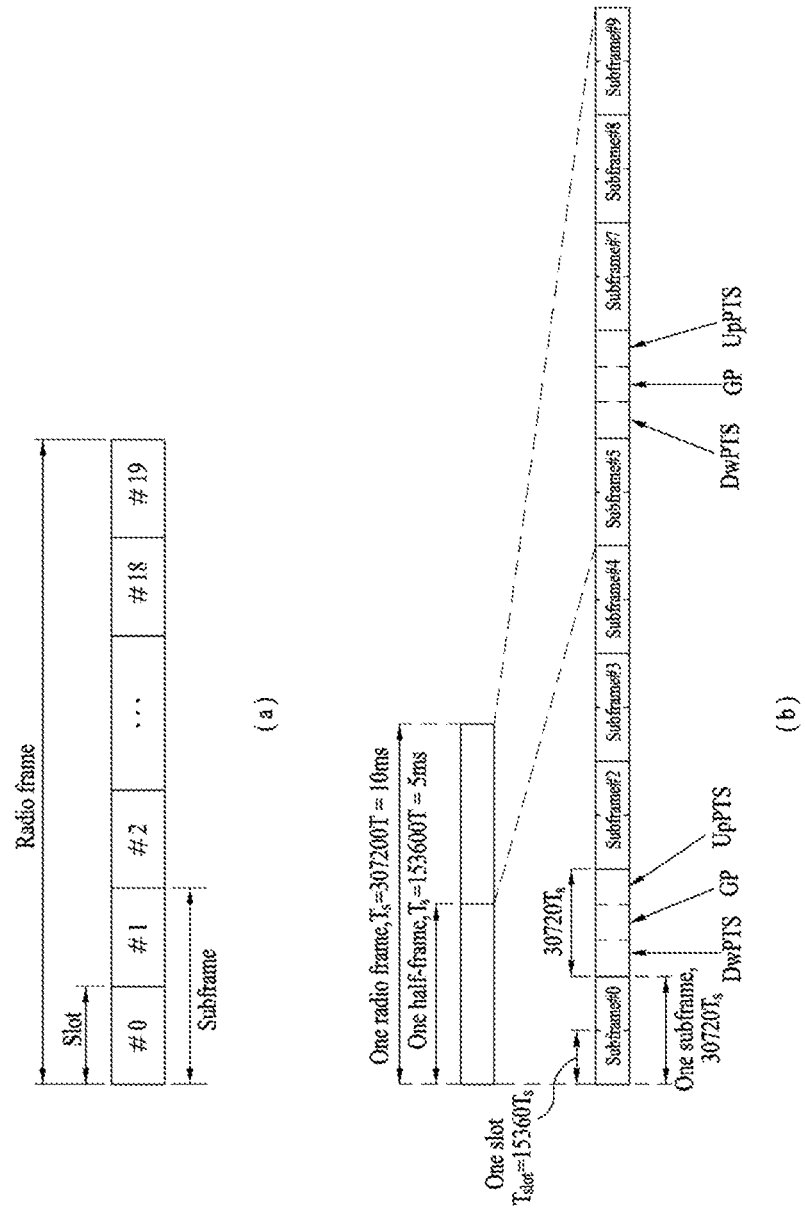
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
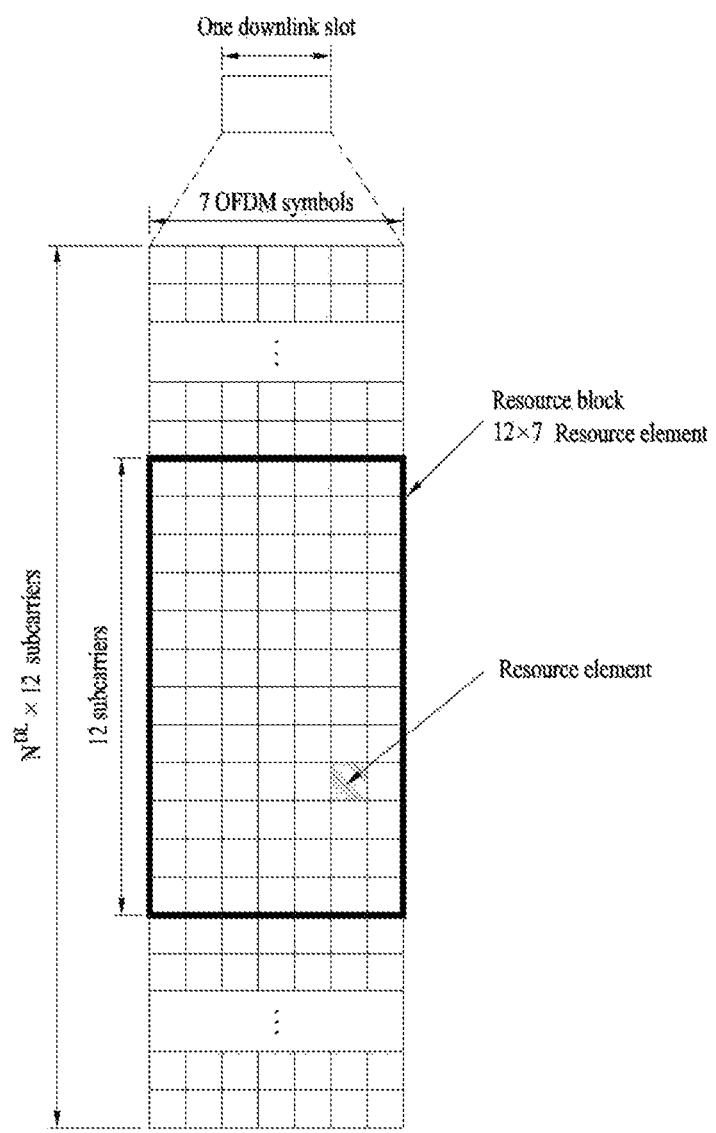
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
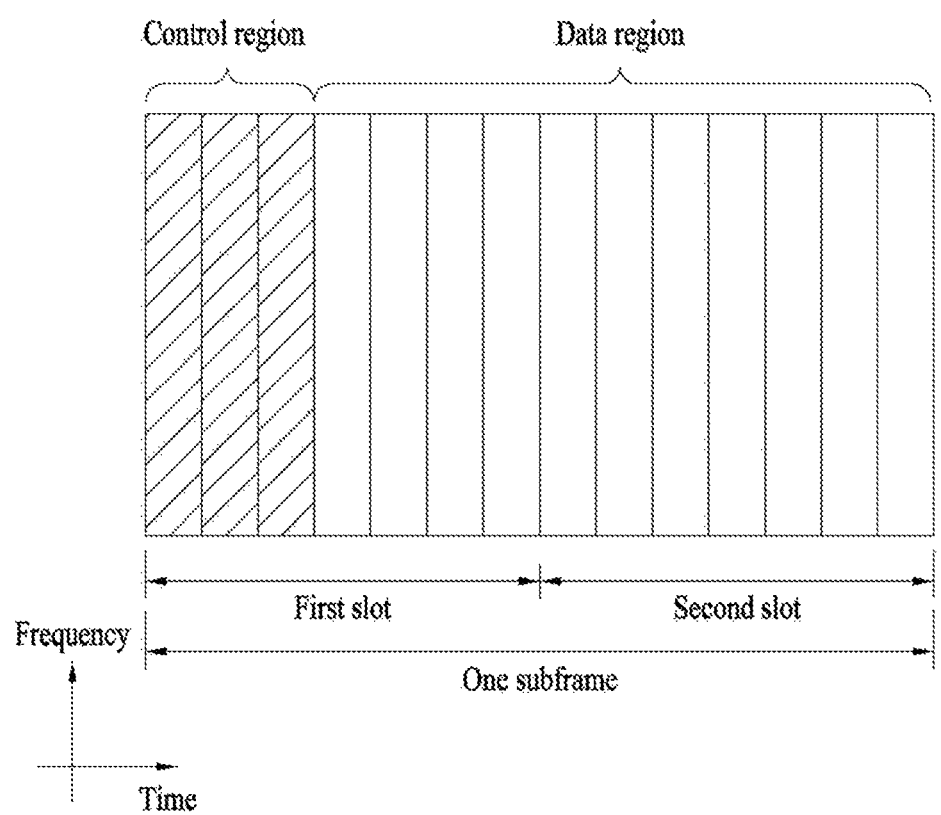
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
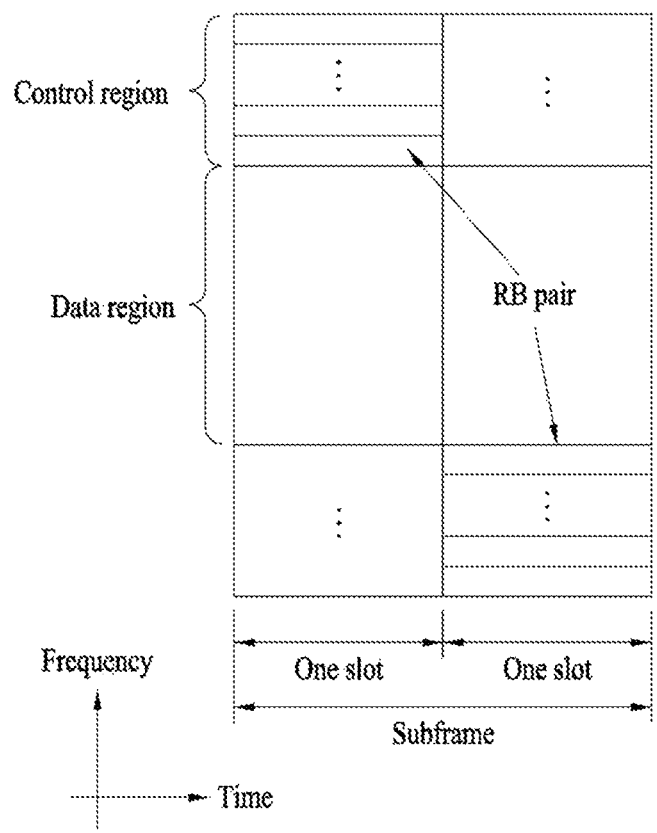
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = $$ [Equation 10]

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
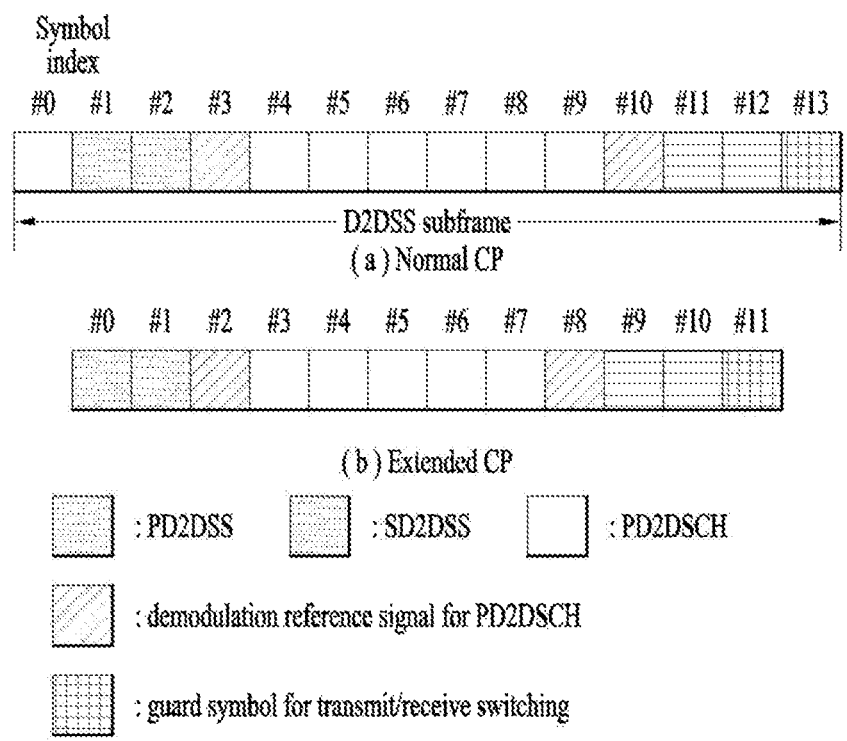
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
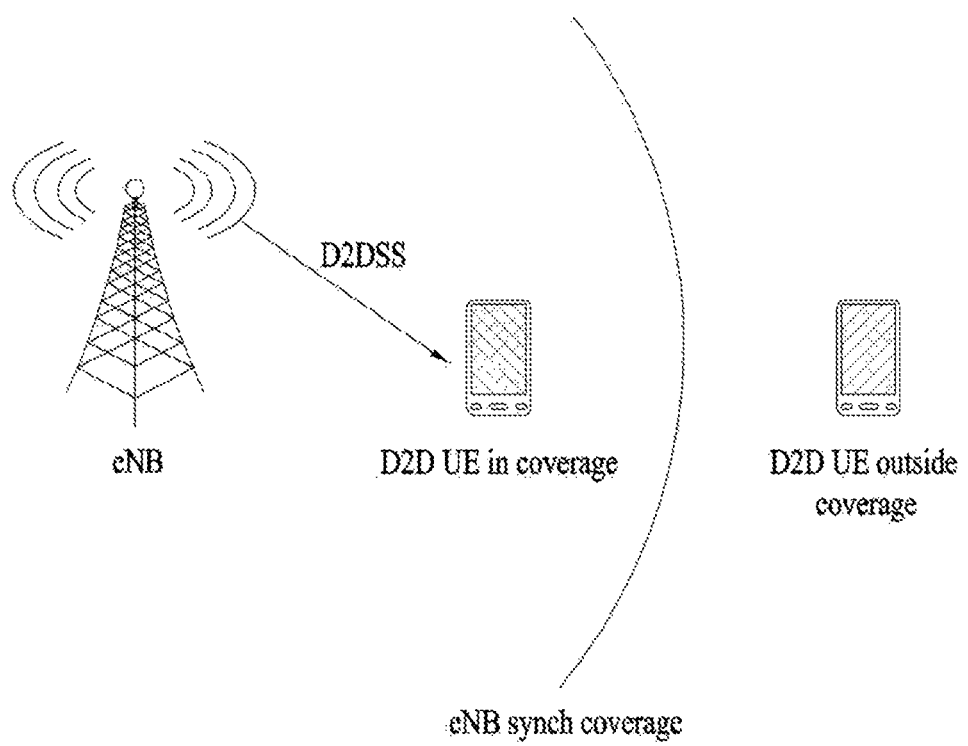
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F * N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MC S) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 10:
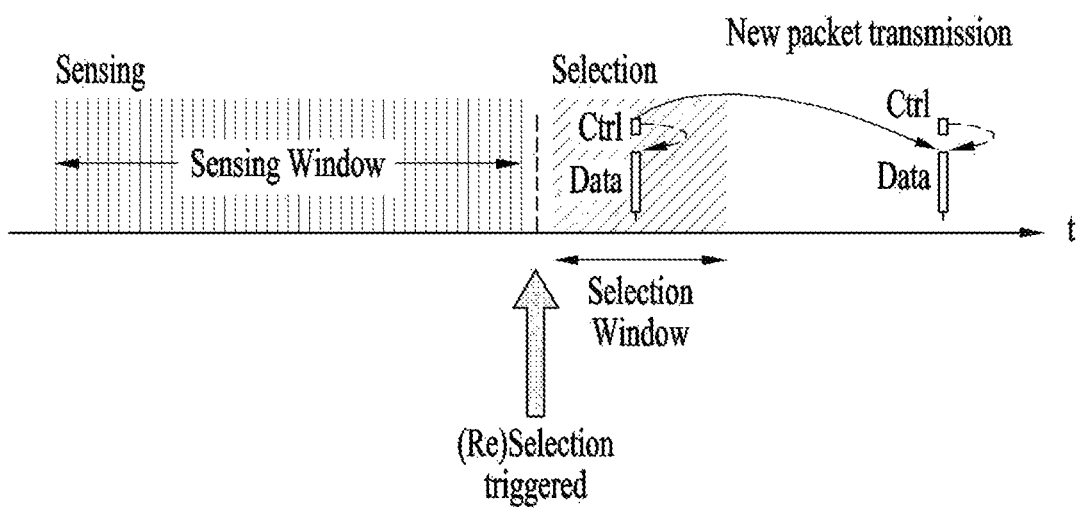
FIG. 10 is a view illustrating a method of selecting resources in V2X.
Figure 11:
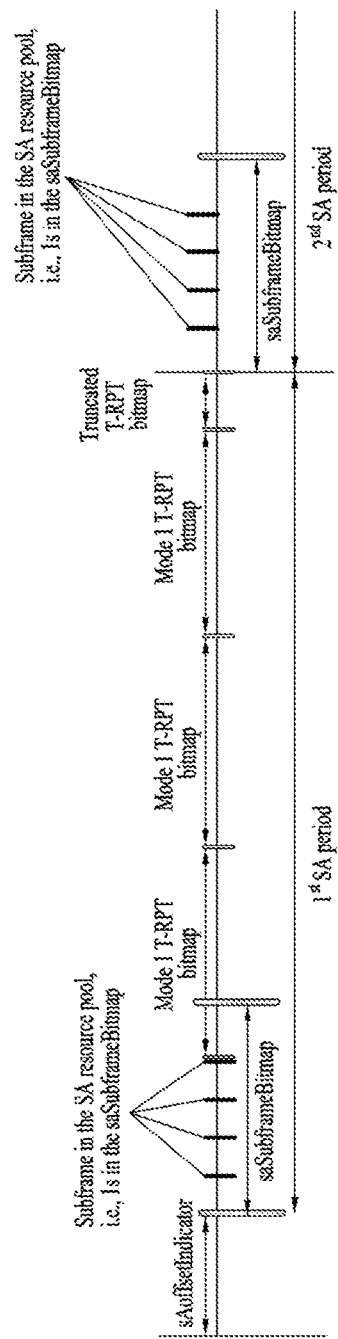
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
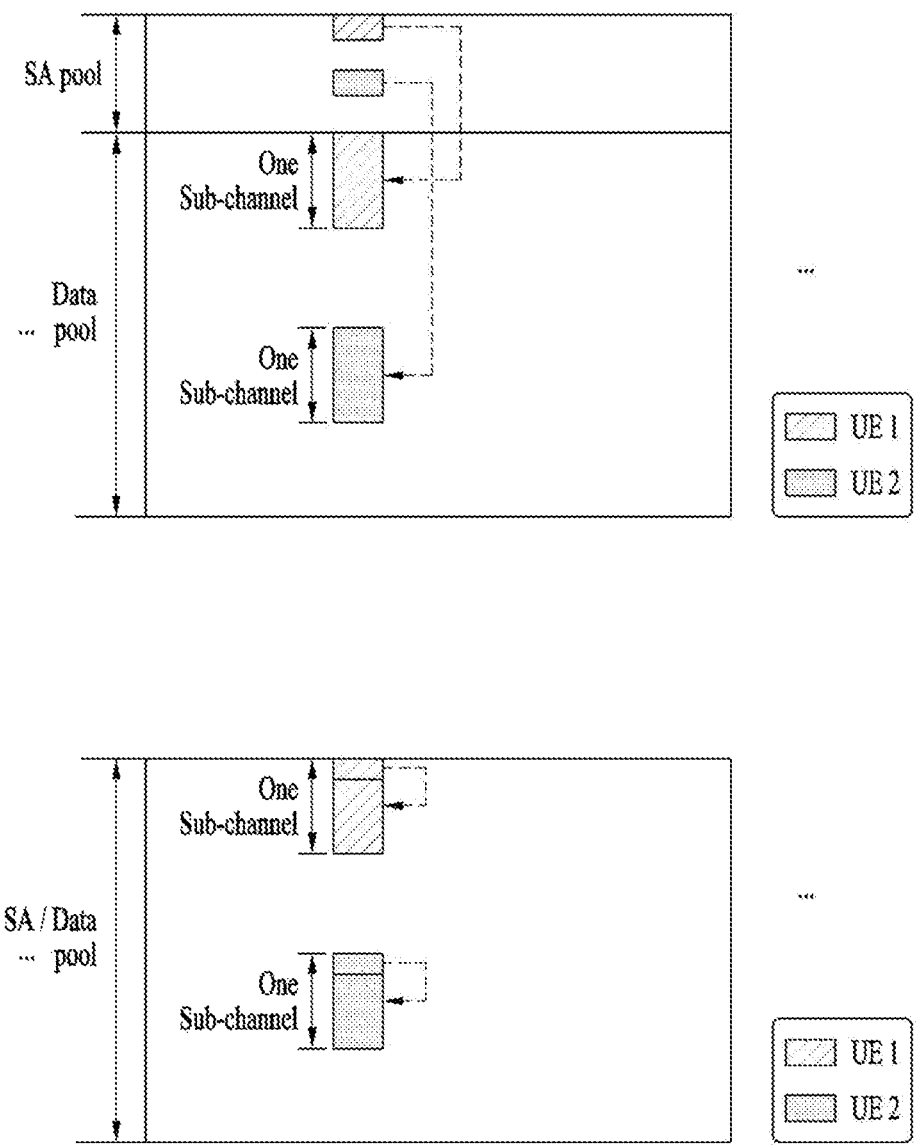
FIG. 12 is a view referred to for describing an SA and data transmission in V2X.

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

NR (New RAT (Radio Access Technology))

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
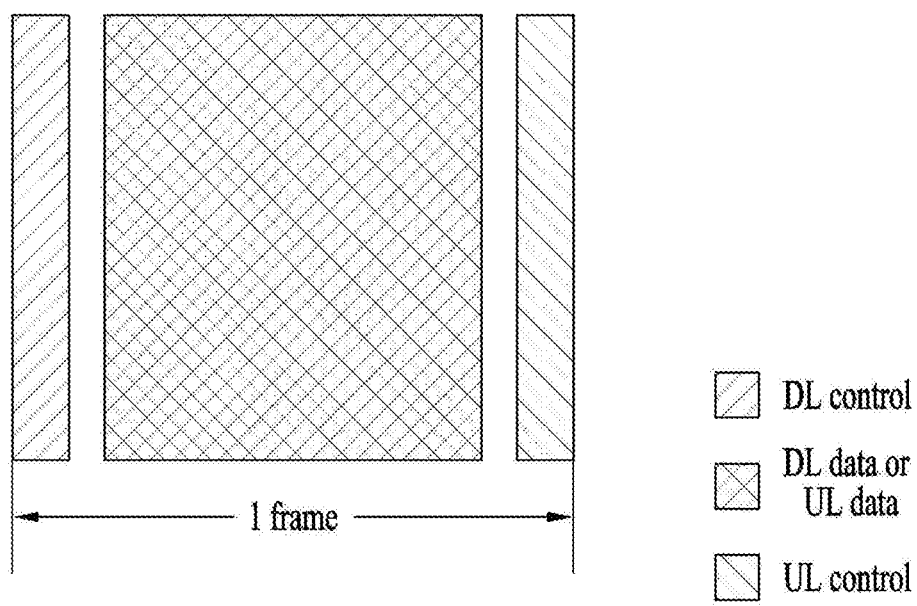

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

OTDOA (Observed Time Difference of Arrival)

Figure 15:
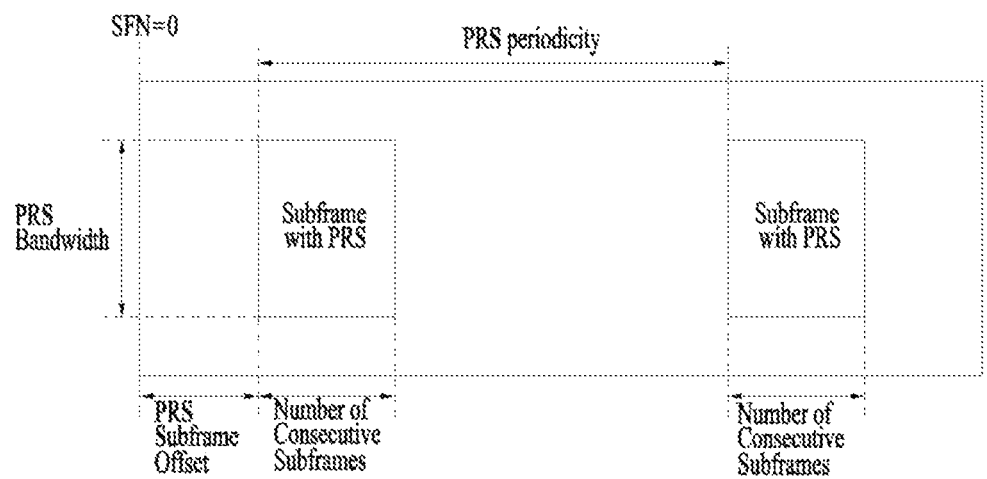
FIG. 15 is a diagram illustrating a positioning reference signal (PRS) transmission structure based on parameters in PRS-Info.

FIG. 15 is a diagram illustrating a positioning reference signal (PRS) transmission structure based on parameters in PRS-Info.

Generally, in cellular communication systems, a network (or a location server) may use various methods to obtain information on the location of a UE. In the LTE system, a UE is configured with information on PRS transmission at eNBs through a higher layer signal. The UE measures PRSs transmitted from neighbor cells thereof and transmits a reference signal time difference (RSTD), which is a reception time difference between a PRS transmitted from a reference eNB and a PRS transmitted from a neighbor eNB, to an eNB or the network (or location server).

The RSTD refers to a relative timing difference between neighbor cell j (or eNB j) and reference cell i (or eNB i) and is defined as '$T_{SubframeRxj} - T_{SubframeRxi}$', where $T_{SubframeRxj}$ denotes the time at which the UE receives the start of one subframe from cell j and $T_{SubframeRxi}$ denotes the time at which the UE receives the start of one subframe from cell i that is closest to a subframe received from cell j. The reference point for the observed subframe time difference may be an antenna connector of the UE. The UE may use a UE reception-transmission (Rx-Tx) time difference to calculate the RSTD. The UE Rx-Tx time difference is defined as '$T_{UE-RX} - T_{UE-TX}$', where $T_{UE-RX}$ is the UE received timing of DL radio frame #i from a serving cell, which is defined by the first detected path in time, and $T_{UE-TX}$ is the UE transmitted timing of UL radio frame #i. The reference point for measuring the UE Rx-Tx time difference may be the antenna connector of the UE.

The network calculates the location of the UE based on the RSTD and other information. Such a positioning scheme for the UE is called observed time difference of arrival (OTDOA) based positioning. Hereinafter, the OTDOA based positioning will be described in detail.

The network calculates the location of the UE based on the RSTD and other information. Such a positioning scheme for the UE is called OTDOA based positioning. Hereinafter, the OTDOA based positioning will be described in detail.

A PRS has a transmission opportunity, i.e. a positioning occasion with a periodicity of 160, 320, 640, or 1280 ms. The PRS may be transmitted during $N_{PRS}$ consecutive DL subframes in the positioning occasion, where $N_{PRS}$ may be 1, 2, 4, or 6. Although the PRS is substantially transmitted in the positioning occasion, the PRS may be muted in the positioning occasion for inter-cell interference coordination.

In other words, if zero transmission power is allocated to REs to which the PRS is mapped in the positioning occasion, the PRS may be transmitted with zero transmission power on PRS REs. Information about PRS muting is provided to the UE as prs-MutingInfo. The transmission bandwidth of the PRS may be configured independently unlike the system bandwidth of a serving eNB.

For PRS measurement, the UE receives configuration information on the list of PRSs that the UE should discover from a location management server (e.g. an enhanced serving mobile location center (E-SMLC) or a secure user plane location (SUPL) platform) of the network. The configuration information includes PRS configuration information of a reference cell and PRS configuration information of neighbor cells. The PRS configuration information includes a positioning occasion periodicity, an offset, the number of consecutive DL subframes constituting one positioning occasion, a cell ID used in PRS sequence generation, a CP type, and the number of CRS antenna ports considered in PRS mapping. The PRS configuration information of neighbor cells includes slot offsets and subframe offsets of the neighbor and reference cells, an expected RSTD, and a degree of uncertainty of the expected RSTD. The PRS configuration information of neighbor cells may allow the UE to determine at which time and in which time window the UE should discover PRSs transmitted from the neighbor cells to detect the corresponding PRSs.

As described above, the LTE system has introduced the OTDOA scheme in which eNBs transmit PRSs and a UE estimates an RSTD from the PRSs based on a time difference of arrival (TDOA) scheme and then transmits the estimated RSTD to a network (or a location server). In the LTE system, an LTE positioning protocol (LPP) has been defined to support the OTDOA scheme. The LPP is terminated between a target device and the location server. The target device may be a UE in a control plane or an SUPL-enabled terminal (SET) in a user plane. The location server may be an E-SMLC in the control plane or an SUPL location platform (SLP) in the user plane. The LPP informs the UE of OTDOA-ProvideAssistanceData with the following configuration as an information element (IE).

TABLE 1

```
-- ASN1START
OTDOA-ProvideAssistanceData ::= SEQUENCE {
    otdoa-ReferenceCellInfo    OTDOA-ReferenceCellInfo        OPTIONAL,    -- Need ON
    otdoa-NeighbourCellInfo    OTDOA-NeighbourCellInfoList    OPTIONAL,    -- Need ON
    otdoa-Error                OTDOA-Error                    OPTIONAL,    -- Need ON
    ...
}
-- ASN1STOP
```

TABLE 2

```
-- ASN1START
OTDOA-ReferenceCellInfo ::= SEQUENCE {
    physCellId         INTEGER (0..503),
    cellGlobalId       ECGI                                   OPTIONAL,    -- Need ON
    earfcnRef          ARFCN-ValueEUTRA                       OPTIONAL,    -- Cond
NotSameAsServ0
    antennaPortConfig  ENUMERATED {ports1-or-2, ports4, ... }
                                                              OPTIONAL,    -- Cond
NotSameAsServ1
    cpLength           ENUMERATED { normal, extended, ... },
    prsInfo            PRS-Info                               OPTIONAL,    -- Cond PRS
    ...,
    [[ earfcnRef-v9a0ARFCN-ValueEUTRA-v9a0 OPTIONAL                        -- Cond
NotSameAsServ2
    ]]
}
-- ASN1STOP
```

In Table 1, OTDOA-NeighbourCellInfo denotes target cells (e.g. eNBs or TPs) for RSTD measurement.

Referring to Table 2, OTDOA-NeighbourCellInfo may include information about a maximum of 24 neighbor cells for each frequency layer with respect to a maximum of three frequency layers. That is, OTDOA-NeighbourCellInfo may indicate information about a total of 72 (=3*24) cells to the UE.

TABLE 3

```
-- ASN1START
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId         INTEGER (0..503),
    cellGlobalId       ECGI                                   OPTIONAL,    -- Need ON
```

TABLE 3-continued

| | | | |
|---|---|---|---|
| earfcn | ARFCN-ValueEUTRA | OPTIONAL, | -- Cond NotSameAsRef0 |
| cpLength | ENUMERATED {normal, extended, ...} | | |
| | | OPTIONAL, | -- Cond NotSameAsRef1 |
| prsInfo | PRS-Info | OPTIONAL, | -- Cond NotSameAsRef2 |
| antennaPortConfig | ENUMERATED {ports-1-or-2, ports-4, ... } | | |
| | | OPTIONAL, | -- Cond NotsameAsRef3 |
| slotNumberOffset | INTEGER (0..19) | OPTIONAL, | -- Cond NotSameAsRef4 |
| prs-SubframeOffset | INTEGER (0..1279) | OPTIONAL, | -- Cond InterFreq |
| expectedRSTD | INTEGER (0..16383), | | |
| expectedRSTD-Uncertainty | INTEGER (0..1023), | | |
| ..., | | | |
| [[ earfcn-v9a0 | ARFCN-ValueEUTRA-v9a0 | OPTIONAL | -- Cond NotSameAsRef5 |
| ]] | | | |
| }
| maxFreqLayers INTEGER ::=3
| -- ASN1STOP Herein, PRS-Info, which is an IE included in OTDOA-ReferenceCellInfo and OTDOA-NeighbourCellInfo, contains PRS information. Specifically, PRS bandwidth, PRS configuration index $I_{PRS}$, the number of consecutive DL subframes $N_{PRS}$, and PRS muting information may be included in PRS-Info as follows.

TABLE 4

```
-- ASN1START
PRS-Info ::= SEQUENCE {
    prs-Bandwidth          ENUMERATED { n6, n15, n25, n50, n75, n100, ... },
    prs-ConfigurationIndex INTEGER (0..4095),
    numDL-Frames           ENUMERATED {sf-1, sf-2, sf-4, sf-6, ...},
    ...,
    prs-MutingInfo-r9      CHOICE {
        po2-r9             BIT STRING (SIZE(2)),
        po4-r9             BIT STRING (SIZE(4)),
        po8-r9             BIT STRING (SIZE(8)),
        po16-r9 BIT STRING (SIZE(16)),
        ...
    }                      OPTIONAL     -- Need OP
}
-- ASN1STOP
```

Referring to FIG. 15, a PRS periodicity $T_{PRS}$ and a PRS subframe offset ΔPRS are determined depending on the value of a PRS configuration index $I_{PRS}$ (prs-Configuration-Index). The PRS configuration index $I_{PRS}$, the PRS periodicity $T_{PRS}$, and the PRS subframe offset ΔPRS are given as shown in the following table.

TABLE 5

| PRS Configuration Index $I_{PRS}$ | PRS Periodicity $T_{PRS}$ (subframes) | PRS Subframe Offset $\Delta_{PRS}$ (subframes) |
|---|---|---|
| 0~159 | 150 | $I_{PRS}$ |
| 160~479 | 320 | $I_{PRS}$ − 160 |
| 480~1119 | 640 | $I_{PRS}$ − 480 |
| 1120~2399 | 1280 | $I_{PRS}$ − 1120 |
| 2400-4095 | Reserved | |

Among the $N_{PRS}$ DL subframes with the PRS, the first subframe satisfies the following equation: $10*n_f + \text{floor}(n_s/2) - \Delta_{PRS}) \mod T_{PRS} = 0$. Herein, $n_f$ is a radio frame number and $n_s$ is a slot number in a radio frame.

To obtain location-related information for supporting a DL positioning scheme, the location server (e.g. E-SMLC) may interact with any eNB reachable from mobility management entities (MMES) having signaling access to the location server. The location related information may include timing information for the eNB in relation to an absolute global navigation satellite system (GNSS) time or timings of other eNB(s) and information about supported cells including PRS schedule. A signal between the location server and the eNB is transmitted through any MME with signaling access to both the location server and the eNB.

In addition to the DL positioning scheme in which a target UE calculates a measurement metric by measuring PRSs transmitted by eNBs, there is a UL positioning scheme in which eNBs measure a signal transmitted by a UE. The UL positioning scheme is based on an uplink time difference of arrival (UTDOA) between UL signals. To support UL positioning, the location server (e.g. E-SMLC) may interact with the serving eNB of the UE to retrieve target UE configuration information. The configuration information includes information required by location measurement units (LMUs) to obtain UL time measurements. The LMUs correspond to eNBs that read a signal transmitted by the UE for the UL positioning. The location server informs the serving eNB that the UE needs to transmit an SRS (up to a maximum SRS bandwidth available for carrier frequency) for the UL positioning. If requested resources are not available, the serving eNB may allocate other resources and feed the allocated resources back to the location server. If there are no available resources, the serving eNB may inform the location server of the fact that there are no available resources.

The location server may request a plurality of LMUs to perform UL time measurement and feed back the measurement results. In the UL positioning, the location of the UE is estimated based on timing measurements of UL radio signals received by different LMUs together with knowledge of geographical coordinates of the different LMUs. The time required for a signal transmitted by the UE to reach an LMU is proportional to the length of a transmission path between the UE and the LMU. A group of LMUs measure a UTDOA by simultaneously sampling UE signals.

Phase Difference Measurement Feedback for Network Based Positioning

The present disclosure relates to a method of improving measurement accuracy. In conventional OTDOA, a UE may feed back an RSTD (i.e., a reception time difference between PRSs from different eNBs). Since the minimum resolution of the RSTD is determined depending on sampling rates, the minimum accuracy of distance measurement is also determined depending on the sampling rates. For example, the sampling rate is 1/Ts in a 20 MHz system and 1/(16 Ts) in a 1.4 MHz system (where Ts=1/(15000*2048)). Thus, a distance estimation error is calculated to be about 9.76 meter in the 20 MHz system and about 145.25 meters in the 1.4 MHz system. That is, the minimum accuracy of distance/location estimation is limited by the measurement resolution of the RSTD.

FIG. 16 is a conceptual diagram illustrating a method of measuring a distance based on correlation in the time domain. Referring to FIG. 16, time-domain resolution is determined depending on sampling rates in the time domain. In addition, as a bandwidth increases, the accuracy of measuring a time difference in the time domain may increase.

To solve such a problem, the present disclosure proposes a method of improving the performance of OTDOA by feeding back information different from an RSTD.

The present disclosure is directed to a method of measuring a distance between wireless communication devices and locations thereof, and more particularly, to a method of measuring a distance between devices corresponding to distance measurement targets based on phase information about radio signals transmitted and received therebetween. For convenience of description, it is assumed that two frequencies are used for signal transmission and reception, but the present disclosure is not limited thereto. That is, the present disclosure is applicable when the number of frequencies varies. In the present disclosure, it is assumed that transmission is simultaneously performed on multiple frequencies. However, transmission may be performed at predetermined different times, and the principles of the present disclosure are applicable in consideration thereof. Such a method of measuring a time delay or a distance based on phase information may not be affected by sampling rates.

Figure 17:
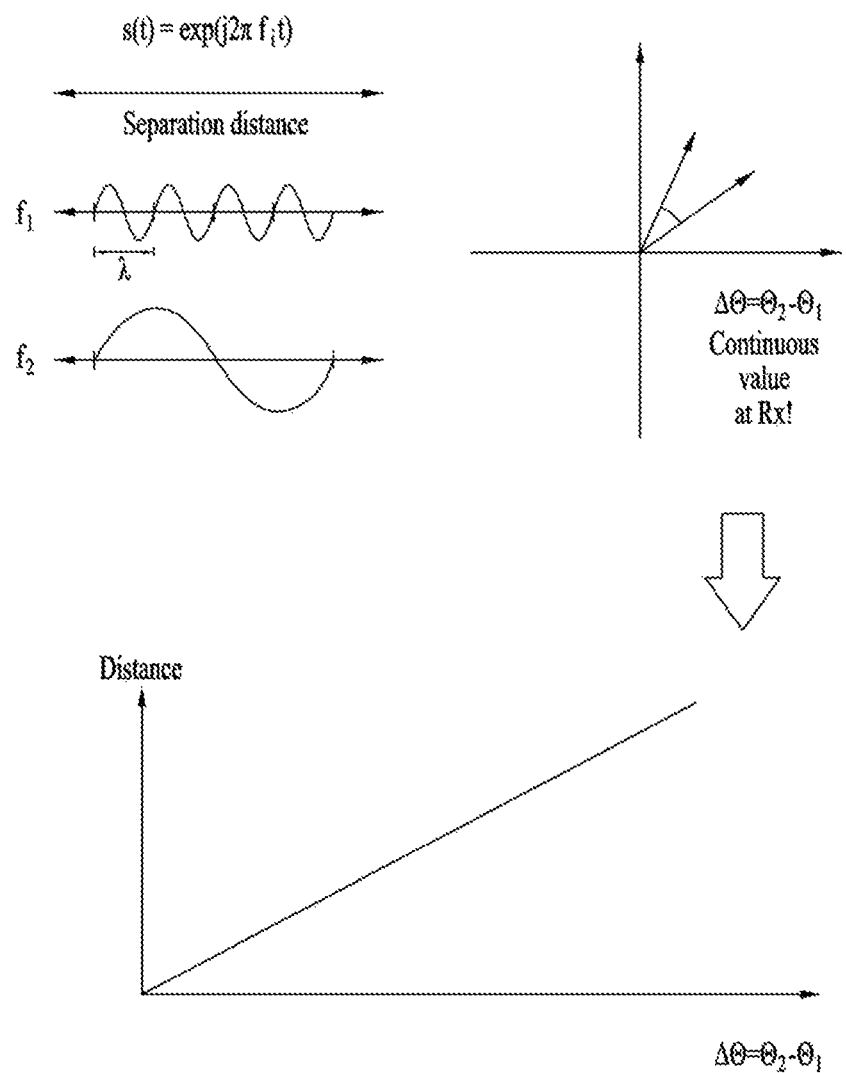
FIG. 17 is a conceptual diagram illustrating a method of measuring a distance based on phases.

FIG. 17 is a conceptual diagram illustrating a method of measuring a distance based on phases. Referring to FIG. 17, since a phase difference between two tones varies linearly depending on the phase of a signal, the sampling rate has no effect on the time domain.

First, it is assumed that a transmitting UE (or an eNB) transmits RSs on two or more frequencies. In this case, it is assumed that information on the size and phase of the RS is predetermined and known to both a transmitter and a receiver. The RS received on an m-th tone may be represented as shown in Equation 12.

$$y_m = a_m \exp(jb_m)\exp(j2\pi m \Delta f \delta) \quad \text{[Equation 12]}$$

In Equation 12, $a_m$ and $b_m$ denote the amplitude and phase response of a channel on the m-th tone, $\Delta f$ denotes a subcarrier spacing, and $\delta$ denotes a time offset between the transmitter and receiver in the time domain. The time offset may include the propagation delay of a radio signal, a sampling time difference between the transmitter and receiver, etc. Eventually, the time offset may represent a time difference between FFT windows of the transmitter and receiver. When signal reception is performed on two tones, a phase difference on each tone may be represented as shown in Equation 13 (in this case, the channel phases of the two tones may be assumed to be equal to each other).

$$\Delta \phi_{m,n} = \angle y_m - \angle y_n = 2\pi \Delta f \delta (m-n) \quad \text{[Equation 13]}$$

Assuming that there is no sampling time difference between the transmitter and receiver and the time offset depends on only the propagation delay, Equation 13 may be changed to Equation 14.

$$\Delta \phi_{m,n} = 2\pi \Delta f (m-n) \frac{R}{c} \quad \text{[Equation 14]}$$

Based thereon, a distance between the two transmitting and receiving UEs may be represented as shown in Equation 15.

$$R_{m,n} = \frac{c \cdot \Delta \phi_{m,n}}{2\pi \Delta w_{m,n}} \quad \text{[Equation 15]}$$

In Equation 15, $w_{m,n}$ denotes a frequency difference between the two tones, $\phi_{m,n}$ denotes a phase difference between the two tones, and c denotes the speed of light (about $3*10^8$). Equation 15 shows distance estimation in one-way ranging (that is, a method by which a receiver measures the propagation delay of a transmitter on the assumption that the transmitter and receiver are synchronized. In two-way ranging (that is, a method by which a receiver returns a signal from a transmitter and the transmitter estimates a distance based on a phase difference), Equation 15 is multiplied by ½.

A measurement value from an i-th eNB in Equation 15 may be represented as shown in Equation 16.

$$\Delta \phi_{m,n}^i = \angle y_m - \angle y_n = 2\pi \Delta f \delta (m-n) \quad \text{[Equation 16]}$$

In Equation 16, $\delta_i$ denotes a time difference between FFT windows of the i-th eNB and a UE. Herein, the time difference is assumed to include all of the following: a synchronization error, a propagation delay, etc. By subtracting a phase difference between the i-th eNB and a j-th eNB, Equation 17 below may be obtained.

$$\Delta \phi_{m,n}^i = \angle y_m - \angle y_n = 2\pi \Delta f \delta_i (m-n) \quad \text{[Equation 17]}$$

In Equation 17, $\delta_i - \delta_j$ corresponds to the RSTD of the OTDOA. In other words, a measurement equivalent to the RSTD may be obtained by calculating a difference between eNBs for a phase difference between two tones for each eNB. In the OTDOA, since a PRS is configured with intervals of 6 subcarriers (=15 kHz*6=90 kHz), a maximum distance difference of about 3333.3 m (=$c/\Delta w_{m,n}$=c/90000) may be measured by calculating a phase difference between adjacent PRSs or RSs in a symbol. Assuming that most cells have a radius smaller than the maximum distance difference, providing feedback on the difference between eNBs for the phase difference to a network (or a location server) may be regarded as the same as providing feedback on the RSTD. As described above with reference to FIG. 15, a location server or an eNB may configure a frequency interval between tones for PRS mapping and a PRS transmission periodicity. The location server may provide the eNB with information on the PRS mapping in advance, and the eNB may transmit a positioning signal to a UE based on the information on the PRS mapping. In this context, when it is said that the eNB transmits a PRS-related signal, it may mean that the eNB transmits the PRS-related signal based on PRS information configured by the network or location server. When it is said that the network or location server transmits the PRS-related signal, it may be interpreted to mean that the network or location server transmits the PRS-related signal through the eNB. When it is said that the UE transmits information on a phase difference to the network or location server, it may be interpreted to mean that the eNB receives the information on the phase difference and then forwards the information on the phase difference to the network or location server.

Hereinafter, a description will be given of a method of feeding back some or all of the following measurement values.

For example, a UE may transmit a phase difference between RSs with a specific frequency interval with respect to an i-th eNB. Since the conventional PRS is arranged at intervals of 6 REs, the UE may feed back a phase difference between adjacent PRSs which are separated at the intervals of 6 REs to the eNB unless there is separate signaling. The eNB may forwards the feedback to the network (or the location server). In this case, if multiple RSs are arranged in the frequency domain, a value obtained by acquiring an SNR gain by performing (weighted) combining (e.g., averaging) of phase differences between individual adjacent RSs may be finally calculated.

The UE may feed back on phase differences for multiple frequency intervals instead of the "specific frequency interval" mentioned in the above method. In this case, the network may provide the UE information on a frequency interval which the UE feeds back the phase difference for through physical layer signaling or higher layer signaling. For example, the network may instruct the UE to feed back a phase difference for channels measured from RSs transmitted on REs with intervals of 90 or 180 kHz. In this case, if the UE observes multiple phase differences between REs with a specific interval, the UE may regard a value obtained by weighted combining of the multiple phase differences as a measurement value.

Alternatively, the UE may calculate a phase difference for each eNB, calculate a difference between the phase differences calculated for individual eNBs, and then feed the calculate difference back to the network or eNB (i.e., serving cell). When the UE subtracts a phase difference for one eNB from that for another eNB, the phase differences need to be measured from RSs with the same frequency interval. If the UE measures a phase difference between RSs with difference frequency intervals for each eNB, the UE may perform subtraction by scaling by a difference between the RS intervals (for example, multiplying $\Delta f$ in Equation 16 by a predetermined value).

Alternatively, the UE may scale the measurement value by a prescribed value and then feed the scaled value back to the network (or the location server). In this case, the prescribed scale value may be indicated by the network (or the location server) or preconfigured. For example, the value of $\delta_i - \delta_j$ calculated in Equation 17 may be directly fed back. In addition, when the value of $\delta_i - \delta_j$ is expected to be extremely small (when distances from two eNBs are similar to each other), the eNB may instruct the UE to provide the feedback based on the predetermined scale value. The reason for this is to minimize quantization errors when the measurement value is quantized with N bits.

Alternatively, the above-described measurement value may be quantized with N bits and then fed back. In the conventional RSTD, a measurement value is quantized using 10 ms as a minimum unit of Ts (0.5 Ts in enhanced RSTD measurement) and then fed back. However, the proposed method may be more robust to the quantization error since 2 pi radians are quantized with N bits (if the quantization is performed with the same number of bits).

Alternatively, the measurement value may be obtained as follow. The UE may transmit an RS (e.g., a PRS) by intentionally rotating the phase thereof, and the eNB may measure the rotation degree, which the UE intentionally make, from the RS and then obtain the measurement value.

The present disclosure is not limited to D2D communication. That is, the disclosure may be applied to uplink or downlink communication, and in this case, the proposed methods may be used by an eNB, a relay node, etc. Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from an eNB to a UE or from a transmitting UE to a receiving UE through a predefined signal (e.g., a physical layer signal, a higher layer signal, etc.).

Figure 18:
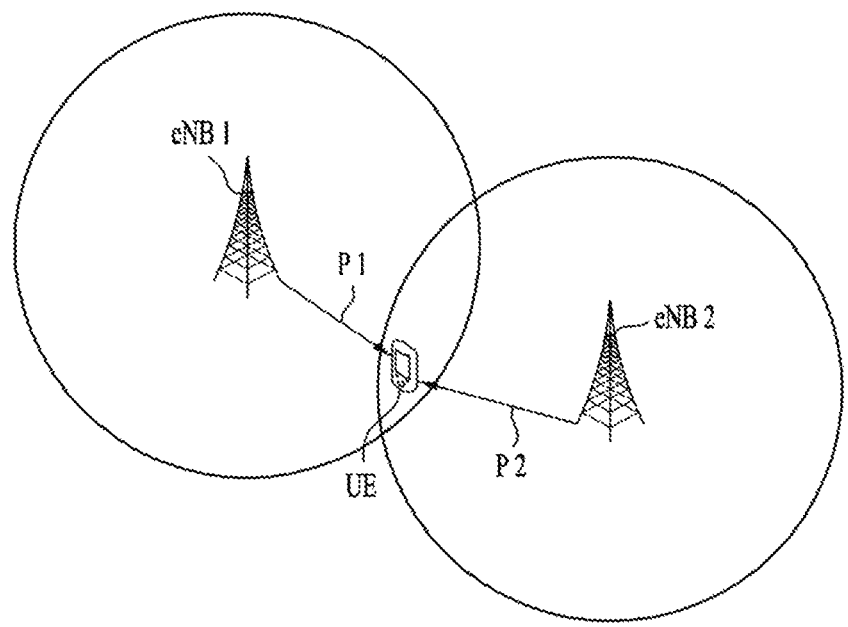
FIG. 18 is a diagram illustrating a user equipment (UE) receiving positioning signals from two evolved node Bs (eNBs)

FIG. 18 is a diagram illustrating a UE receiving positioning signals from two eNBs.

Referring to FIG. 18, the UE may receive the positioning signals (P1 and P2) from the two eNBs (eNB 1 and eNB 2). In this case, the UE may receive the positioning signals (P1 and P2) from the two eNBs at different timings due to difference distances from the two eNBs. Such a timing difference may correspond to a phase difference between RSs included in the positioning signal.

Specifically, the positioning signals (P1 and P2) may include RSs mapped to two tones with a specific frequency interval. In this case, the phase rotation of an RS mapped to each tone may vary depending on the frequency interval. Thus, the distance from the UE to each eNB transmitting the positioning signal may be calculated according to Equation 18 below.

$$d = \frac{c\Delta\theta}{4\pi\Delta f} \quad \text{[Equation 18]}$$

In Equation 18, $\Delta\theta$ denotes a phase difference between the two tones, $\Delta f$ denotes a frequency difference between the two tones, and c is the constant of the speed of light.

The UE may measure a first phase difference corresponding to a phase difference between RSs measured from the positioning signal (P1) received from an eNB corresponding to a serving cell (eNB 1). The UE may measure a second phase difference corresponding to a phase difference between RSs measured from the positioning signal (P2) received from the other eNB (eNB 2). The UE may calculate a difference between the measured first and second phase differences. The difference may include information corresponding to an RSTD as described above with reference to Equation 17. Specifically, the difference may include the information corresponding to the RSTD, which is a time difference between the reception timing of the positioning signal (P1) from the eNB (eNB 1) and the reception timing of the positioning signal (P2) from the other eNB (eNB 2).

In other words, the UE may measure the phase difference between the RSs for each eNB based on the two positioning signals (P1 and P2) received from the two eNBs (eNB 1 and eNB 2). The UE may transmit the difference between the phase differences of the two eNBs to the eNB corresponding to the serving cell (eNB 1), instead of transmitting the RSTD, i.e., time information.

When the specific frequency interval is large, the phase difference measured by the UE may include ambiguous phase information. For example, when the specific frequency interval between the RSs where the phase difference is measured is large and when the distance from the UE to the eNB is long, the phase difference measured by the UE may be greater than or equal to 2 pi radians. In this case, the UE may not clearly know whether or not the measured phase difference is rotated 2 pi radians or more. Thus, the eNB (eNB 1) may transmit to the UE RSs mapped to two tones with a frequency interval smaller than the specific frequency interval. The UE may confirm whether or not the phase difference between the RSs mapped to the two tones with the specific frequency interval is rotated by 2 pi radians or more based on a phase difference between the RSs mapped to the two tones with the frequency interval smaller than the specific frequency interval.

The UE may include information on the confirmed phase difference between the RSs mapped to the two tones with the specific frequency interval in positioning information and then feed the positioning information back to the eNB (eNB 1).

Figure 19:
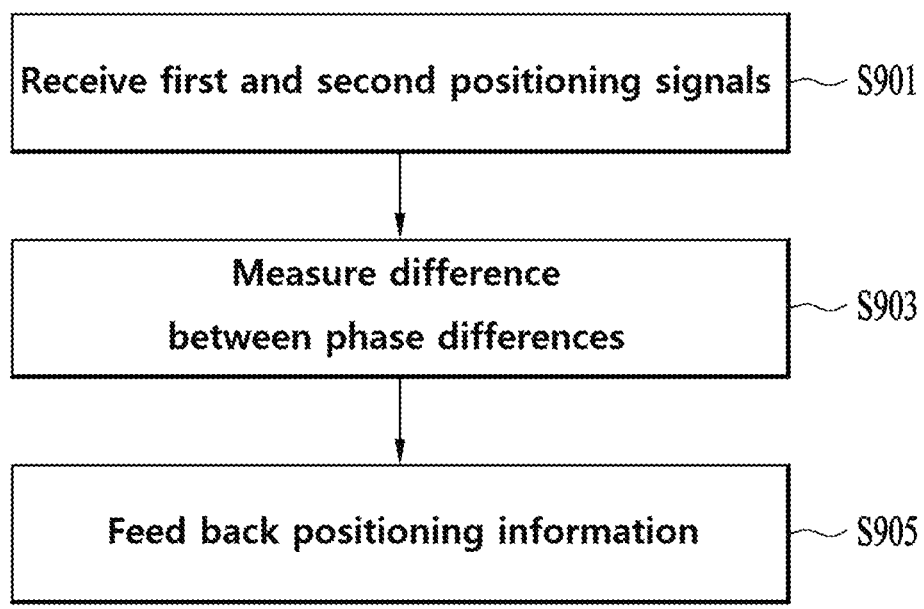
FIG. 19 is a flowchart for explaining a method by which a UE feeds back positioning information based on a positioning signal according to an embodiment of the present disclosure.

FIG. 19 is a flowchart for explaining a method by which a UE feeds back positioning information based on a positioning signal according to an embodiment of the present disclosure.

Referring to FIG. 19, the UE may receive a first positioning signal from a first eNB and receive a second positioning signal from a second eNB. The first positioning signal may include RSs respectively mapped to at least two tones, and the at least two tones may be spaced at a predetermined frequency interval. Similarly, the second positioning signal may include RSs respectively mapped to the at least two tones, and the at least two tones may be spaced at the predetermined frequency interval (S901).

Regarding the first and second positioning signals, the frequency interval for RS mapping and the number of mapped RSs may be determined by an eNB or a location server. For example, in each of the first and second positioning signals, RSs may be mapped at an interval of 6 REs in the frequency domain. It is assumed that the first eNB corresponds to the serving cell of the UE.

The frequency interval between two tones where RSs included in each of the first and second positioning signals are mapped may be predetermined. In this case, the location server may predetermine the interval between the two tones and then provide information thereon to the first eNB. The first eNB may transmit to the UE the first positioning signal including the RSs mapped to the at least two tones with the frequency interval predetermined by the location server. Similarly, the location server may predetermine the interval between the two tones and then provide information thereon to the second eNB. The second eNB may transmit to the UE the second positioning signal including the RSs mapped to the at least two tones with the frequency interval predetermined by the location server.

Figure 20:
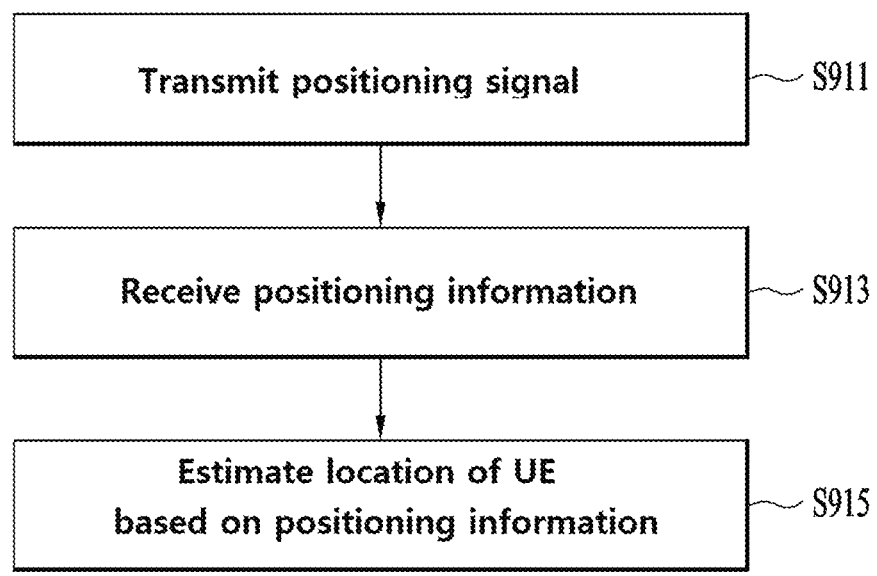
FIG. 20 is a flowchart for explaining a method by which a network estimates the location of a UE based on positioning information transmitted from the UE according to an embodiment of the present disclosure.

The location server may determine the frequency interval between the two tones by considering the selectivity of channels carrying the first and second positioning signals. For example, a phase difference between RSs mapped to two tones with a narrow frequency interval may be significantly affected by noise. If the location server determines that there is large noise based on the selectivity of the channels, the location server may increase the frequency interval between the two tones. In addition, as shown in FIG. 20, the location server may map RSs to two tones with a narrow frequency interval and map RS to two tones with a wide frequency interval as well. In this case, the location server (or eNB) may instruct the UE to measure not only a phase difference between the RS mapped to the two tones with the narrow frequency interval but also a phase difference between the RS mapped to the two tones with the wide frequency interval. Thus, the location server (or eNB) may approximately estimate the location of the UE based on a difference between phase differences of the RSs mapped to the two tones with the narrow frequency interval and adjust the approximately estimated location of the UE based on a difference between phase differences of the RSs mapped to the two tones with the wide frequency interval.

The UE may measure a first phase difference which is a phase difference between the RSs included in the received first positioning signal. As described above, the phase rotation of an RS on each tone may vary depending on the distance between the first eNB and the UE. The first phase difference may refer to a phase rotation difference between the RSs respectively mapped to the two tones with the predetermined frequency interval. Similarly, the UE may measure a second phase difference which is a phase difference between the RSs included in the received second positioning signal. The second phase difference may refer to a phase rotation difference between the RSs respectively mapped to the two tones with the predetermined frequency interval. The UE may calculate a difference between the first and second phase differences (S903).

When the UE intends to measure a phase difference for the second positioning signal, if the UE measures the phase difference between the RSs mapped to the two tones with the specific frequency interval included in the first positioning signal, the UE needs to measure the phase difference between the RSs mapped to the two tones with the specific frequency interval included in the second positioning signal. To measure a difference between information corresponding to time differences, the UE may use RSs mapped to two tones with the same frequency interval when measuring the first and second phase differences for the first and second positioning signals, respectively.

Alternatively, the first and second positioning signals may include multiple RS mapped to multiple tones spaced with a prescribed frequency interval. In this case, when measuring the first phase difference, the UE may calculate a phase difference between RSs for the prescribed frequency interval multiple times by alternating two adjacent tones and then determine the average of the calculated phase differences as the first phase difference. For example, when the first positioning signal includes RSs mapped to first to fifth tones spaced at a predetermined frequency interval, the UE may measure a phase difference between RSs mapped to the first and second tones, measure a phase difference between RSs mapped to the second and third tones, measure a phase difference between RSs mapped to the third and fourth tones, and measure a phase difference between RSs mapped to the fourth and fifth tones. Thereafter, the UE may calculate the average of the measured phase differences and then determine the average as the first phase difference. Alternatively, the UE may calculate the average by applying different specific weights. Since the SNR gain may vary for each frequency band, the UE may average phase differences between every two adjacent tones in various frequency regions to obtain the first phase difference that is more accurate and more robust to noise effects.

Similarly, when measuring the second phase difference, the UE may calculate a phase difference between RSs for the prescribed frequency interval multiple times by alternating two adjacent tones included in the second positioning signal and then determine the average of the calculated phase differences as the second phase difference.

The UE may calculate the difference between the measured first and second phase differences. As described above with reference to Equation 17, the difference may include information corresponding to information on the time difference between the reception timings of the positioning signals. To measure the difference between the information corresponding to the time differences as described above, the UE may use the RSs mapped to the two tones with the same frequency interval when measuring the first and second phase differences for the first and second positioning signals, respectively.

The UE may feed back to the eNB the positioning information including the difference. As described above, the difference may provide the eNB or the location server information corresponding to the RSTD. When the UE feeds back the difference to the eNB, the eNB may forward the difference to the location server, and the location server may obtain the location of the UE based on the difference.

When the UE feeds back the difference to the eNB, the eNB may change and transmit the difference in various ways. Specifically, if the difference is less than a predetermined threshold, the UE may multiply the difference by a specific scale value and then include the scaled difference in the positioning information. For example, when the distance from the UE to the first eNB is not significantly different from the distance from the UE to the second eNB, the difference may be very small. In this case, the UE may multiply the calculated difference by the specific scale value and then feed back the positioning information to the eNB by including the scaled difference in the positioning information. To minimize quantization errors, the UE may quantize the measured difference when feeding back the difference to the eNB.

The difference included in the positioning information may be quantized with N bits. Since the difference is phase information, the difference may correspond to information related to 2 pi radians. When the 2 pi radians is expressed by N-bit information, the UE may divide the 2 pi radians into the size of information that can be expressed by the N bits to obtain a minimum phase unit and then feed back the difference to the eNB using the minimum phase unit. For example, if the quantization is performed with 10 bits, there are 1024 pieces of information. Thus, the difference may be quantized in a unit of about 0.001953125 pi radians obtained by dividing the 2 pi radians into 1024. In this case, quantization errors may be reduced compared to when time information is quantized.

The UE may transmit a specific RS that is phase rotated by the difference to feed back the positioning information to the first eNB. In this case, the first eNB may obtain the difference calculated by the UE by measuring the rotation of the specific RS.

FIG. 20 is a flowchart for explaining a method by which a network estimates the location of a UE based on positioning information transmitted from the UE according to an embodiment of the present disclosure. The network may include a location server.

Referring to FIG. 20, the network may transmit to the UE a positioning signal including first RSs mapped to two tones with a first frequency interval. In this case, a first positioning signal may be transmitted by a first eNB, and a second positioning signal may be transmitted by a second eNB adjacent to the first eNB. Each of the first and second positioning signals may include multiple RSs respectively mapped to multiple tones with the first frequency interval (S911).

Specifically, the network may predetermine the first frequency interval, which is a frequency interval between two tones where RSs included in the first and second positioning signals are mapped. The network may provide PRS information including information on the first frequency interval to both the first and second eNBs.

Alternatively, the network may instruct the first and second eNBs to transmit a positioning signal including not only the first RSs mapped to the two tones with the first frequency interval but also second RSs mapped to two tones with a second frequency interval. The second frequency interval is greater than the first frequency interval. The network (or the first or second eNB) may instruct the UE to measure a phase difference between the second RSs included in the first positioning signal and a phase difference between the second RSs included in the second positioning signal. In addition, the network (or the first or second eNB) may instruct the UE to calculate a second difference between the phase differences.

Alternatively, the network may determine whether to further include the second RSs in each of the first and second positioning signals by considering the coverage of the first and second eNBs or the states of channels carrying the first and second positioning signals. For example, when the channel state is less than a predetermined channel state threshold, the network may instruct the eNBs (or first and second eNBs) (or the first eNB corresponding to the serving cell) to feed back the first and second positioning signals, each of which including the first and second RSs.

The UE may feed back to the network positioning information calculated based on the first and second positioning signals. Alternatively, the UE may feed back the positioning information to the first eNB corresponding to the serving cell, and the first eNB may forward the positioning information to the network. The positioning information may include at least one of phase differences measured from the first RSs and a difference between the phase differences of the first and second positioning signals (S913).

Alternatively, when the first and second positioning signals, each of which includes the first and second RSs, are transmitted, the network may instruct the UE to measure or calculate both a first difference for the first RSs and the second difference for the second RSs. In this case, the network may receive the positioning information including the first and second differences from the UE or the first eNB.

The network may inform the UE whether to measure the second difference and include the second difference in the positioning information by considering the coverage of the first and second eNBs or the states of the channels carrying the first and second positioning signals. Such an indication may be signaled to the UE in a higher layer signal including a separate indicator. For example, when the selectivity of the channels carrying the first and second positioning signals is less than a predetermined selectivity threshold, the network may instruct the UE to additionally calculate the second difference for the second RSs and feed back the positioning information including information on the calculated first and second differences.

The network may inform the UE how to feed back the first and second differences as the positioning information in advance. For example, the network may instruct the UE that the UE needs to multiply a specific scale value to the first or second difference if the first or second difference is less than a predetermined threshold and then feed back the positioning information including the first or second difference.

The network may instruct the UE to transmit a specific RS phase-rotated by the first or second difference. Thus, the network may obtain the positioning information by measuring the phase rotation of the specific RS.

The network may determine or estimate the location of the UE based on the positioning information. The first or second difference may include information corresponding to an RSTD required for OTDOA-based UE positioning as described above with reference to velocities. That is, the network may determine or estimate the location of the UE from the first or second difference based on Equation 17. Further, when determining or estimating the location of the UE, the network may consider location information of the first and second eNB as well as the first and second differences (S915).

Upon receiving the positioning information including the first and second differences, the network may estimate the location of the UE based on the first and second differences. For example, the network may approximately estimate the location of the UE based on the first difference and then accurately adjust the location of the UE based on the second difference.

Specifically, the network may approximately estimate the location of the UE by considering that the first difference measured for the two tones with a narrow frequency interval (i.e., the first frequency interval) is significantly affected by noise. In this case, the network may know based on the first difference whether the second difference measured for two tones with a wide frequency interval (i.e., the second frequency interval) is rotated by 2 pi radians or more. In other words, the network may eliminate ambiguity in the phase difference between the second RSs mapped to the two tones with the second frequency interval, i.e., the wide frequency interval based on the first difference. For example, when the first difference is 30 degrees and the second difference is 10 degrees, the network may recognize that the second difference is 370 degrees by considering a rotation of 2 pi radians. Thereafter, the network may compare the estimated location of the UE with the approximately estimated location of the UE based on the second difference to estimate the location of the UE more accurately.

Figure 21:
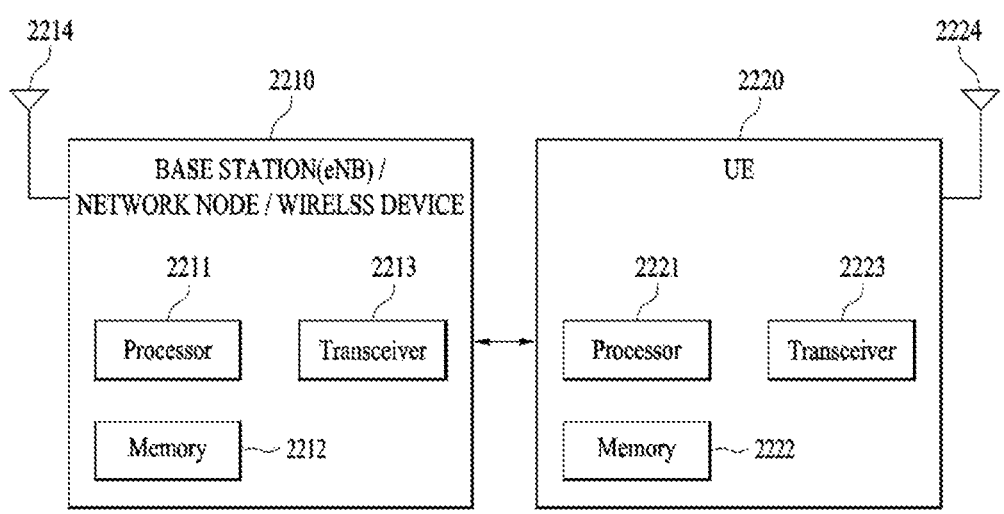
FIG. 21 is a block diagram of wireless communication devices according to an embodiment of the present disclosure.

FIG. 21 is a block diagram of wireless communication devices according to an embodiment of the present disclosure.

Referring to FIG. 21, a wireless communication system may include a BS (eNB) 2210 and a UE 2220. The UE 2220 may be located in the coverage of the BS 2210. In some embodiments, the wireless communication system may include a plurality of UEs. Although FIG. 21 shows the BS 2210 and the UE 2220, the present disclosure is not limited thereto. For example, the BS 2210 may be replaced with a network node, a UE, a radio device, etc. Alternatively, each of the BS and UE may be substitute with a radio device or a radio communication device.

The BS 2210 may include at least one processor 2211, at least one memory 2212, and at least one transceiver 2213. The processor 2211 may be configured to process the details of the embodiments to implement the functions, procedures, or methods described above in the embodiments.

Specifically, the processor 2211 may control the transceiver 2213 to transmit a first positioning signal including first RSs mapped to two tones with a first frequency interval. The processor 2211 may control the transceiver 2213 to be fed back from the UE positioning information including a difference between phase differences between RSs included in the first positioning signal and RSs included in a second positioning signal transmitted from another BS (eNB). The processor 2211 may control the transceiver 2213 to forward the positioning information to a network or a location server as described in FIG. 20. Alternatively, the processor 2211 may obtain information corresponding to an RSTD based on the difference included in the positioning information and then estimate or know the location of the UE.

In addition, the processor 2211 may implement one or more protocols. For example, the processor 2211 may implement one or more radio interface protocol layers (e.g., functional layers). The memory 2212 may be connected to the processor 2211 and configured to store various types of information and/or instructions. The transceiver 2213 may be electrically connected to the processor 2211 and configured to transmit and receive radio signals under the control of the processor 2211.

The UE 2220 may include at least one processor 2221, at least one memory 2222, and at least one transceiver 2223. The processor 2221 may be configured to process the details of the embodiments to implement the functions, procedures, or methods described above in the embodiments.

Specifically, the processor 2221 may control the transceiver 2223 to receive a first positioning signal from a first BS and receive a second positioning signal from a second BS. The processor 2221 may measure a first phase difference between RSs included in the first positioning signal and a second phase difference between RS included in the second positioning signal. The processor 2221 may calculate a difference between the first and second phase differences. The processor 2221 may control the transceiver 2223 to feed back positioning information including the calculated difference to the first BS. The first and second positioning signals, which are received through the transceiver 2223 from the first and second BSs, may be stored in the memory 2222. The processor may receive, from the memory 2222, information corresponding to the first and second positioning signals stored in the memory 2222.

Alternatively, the processor 2221 may measure the first and second phase differences for RSs mapped to two tones with the same frequency interval. Alternatively, the processor 2221 may forward to the first BS the difference from which information corresponding to an RSTD may be obtained. Alternatively, the processor 2221 may determine whether to apply a predetermined scale value to the difference based on the size of the difference. Alternatively, the processor 2221 may quantize the difference with N bits and include the quantized difference in the positioning information. Alternatively, the processor 2221 may generate an RS phase-rotated by the magnitude of the difference and control the transceiver 2223 to transmit the generated RS to the first BS. Alternatively, the processor 2221 may control the transceiver 2223 to receive the first and second positioning signals, each of which including RSs mapped to at least two tones with a predetermined first frequency interval. Alternatively, the processor 2221 may receive the first and second positioning signals each including the RSs mapped to the at least two tones with the predetermined first frequency interval, which is determined by a location server for estimating the location of the UE. Alternatively, the processor 2221 may receive the first and second positioning signals each including the RSs mapped to the at least two tones with the predetermined first frequency interval, which is determined by the location server for estimating the location of the UE, by considering at least one of the selectivity of a channel carrying the first positioning signal and the selectivity of a channel carrying the second positioning signal In addition, the processor 2221 may implement one or more protocols. For example, the processor 2221 may implement one or more radio interface protocol layers (e.g., functional layers). The memory 2222 may be connected to the processor 2221 and configured to store various types of information and/or instructions. The transceiver 2223 may be electrically connected to the processor 2221 and configured to transmit and receive radio signals under the control of the processor 2221.

The memory 2212 and/or 2222 may be located inside or outside the processor 2211 and/or 2221 and connected to the processor 2211 and/or 2221 in various ways such as wireless or wired connections.

Each of the BS 2210 and/or the UE 2220 may have a single antenna or multiple antennas. For example, an antenna 2214 and/or 2224 may be configured to transmit and receive radio signals.

Figure 22:
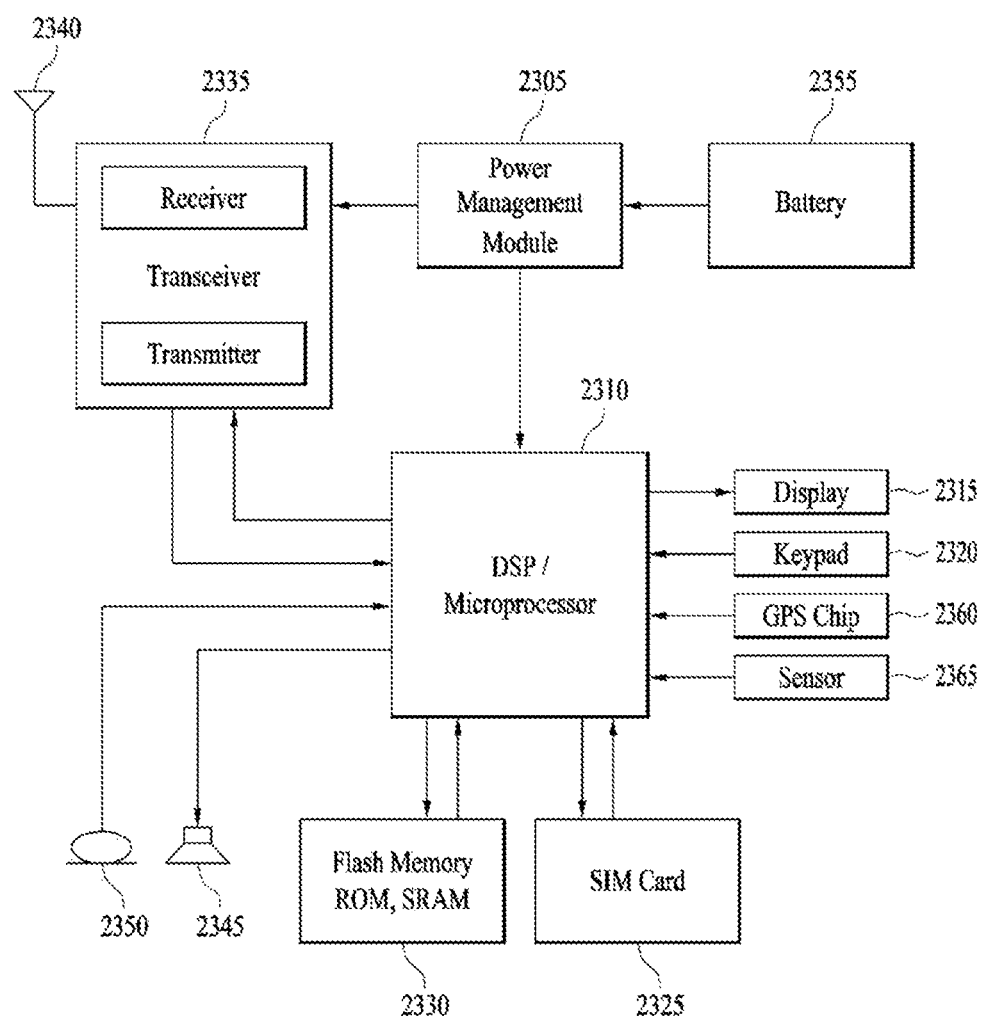
FIG. 22 shows one example of an implementation of a wireless communication device according to some implementations of the present disclosure.

FIG. 22 is a diagram schematically illustrating a wireless communication device according to the present disclosure.

Particularly, FIG. 22 illustrates, as an example, the UE 2220 shown in FIG. 21 in detail. However, the wireless communication device of FIG. 22 is not limited to the UE 2220, and the wireless communication device may be any mobile computing device configured to be suitable for implementing at least one of the above-described embodiments. For example, such a mobile computing device may include a vehicle communication system and/or device, a wearable device, a laptop, a smartphone, etc.

Referring to FIG. 22, the UE 2220 may include at least one of the following components: a processor 2310 including a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345, and a microphone 2350. The UE 2220 may include a single antenna or multiple antennas.

The processor 2310 may be configured to process the details of the embodiments to implement the functions, procedures, or methods described above in the embodiments. In some embodiments, the processor 2310 may implement one or more protocols such as radio interface protocol layers (e.g., functional layers).

The memory 2330 may be connected to the processor 2310 and configured to store information related to operations of the processor 2310. The memory 2330 may be located inside or outside the processor 2310 and connected to the processor 2310 in various ways such as wireless or wired connections.

A user may enter various types of information (e.g., instruction information such as a phone number) in various ways, for example, by pushing the buttons on the keypad 2320 or by voice recognition through the microphone 2350. The processor 2310 may receive and process the information from the user and then perform an appropriate function such as dialing the phone number. In some embodiments, data (e.g., operational data) may be retrieved from the SIM card 2325 or the memory 2330 to perform specific function(s). In some embodiments, the processor 2310 may receive and process GPS information from the GPS chip 2360 and then perform functions related to the position or location of the UE (e.g., vehicle navigation, map services, etc.). In some embodiments, the processor 2310 may display various types of information and data on the display 2315 for the user's reference and convenience.

The transceiver 2335 may be connected to the processor 2310 and configured to transmit and/or receive a radio signal such as a radio frequency (RF) signal. The processor 2310 may control the transceiver 2335 to initiate communication and transmit radio signals including various types of information or data, for example, voice communication data. The transceiver 2335 includes a receiver configured to receive a radio signal and a transmitter configured to transmit a radio signal. The antenna 2340 is a device for performing radio signal transmission and reception. In some embodiments, upon receiving radio signals, the transceiver 2335 may forward and convert the signals to baseband frequency for processing by the processor 2310. The processed signals may be converted into audible or readable information based on various techniques, and the audible or readable information may be output through the speaker 2345 or the display 2315.

In some embodiments, the sensor 2365 may be connected to the processor 2310. The sensor 2365 may include one or more sensing devices configured to detect various types of information such as a speed, acceleration, light, vibration, proximity, location, image, etc. The processor 2310 may receive and process sensor information obtained from the sensor 2365 and perform various types of functions such as collision avoidance, autonomous driving, etc.

As shown in FIG. 22, the UE may further include various components (e.g., a camera, a universal serial bus (USB) port, etc.). For example, a camera may be further connected to the processor 2310 and used for various services such as autonomous driving, vehicle safety services, etc. That is, FIG. 22 shows one example of the UE, and thus, the scope of the present disclosure is not limited to the configuration illustrated in FIG. 22. For example, some of the following components: the keypad 2320, the GPS chip 2360, the sensor 2365, the speaker 2345, and the microphone 2350 may not be included or implemented in the UE.

Figure 23:
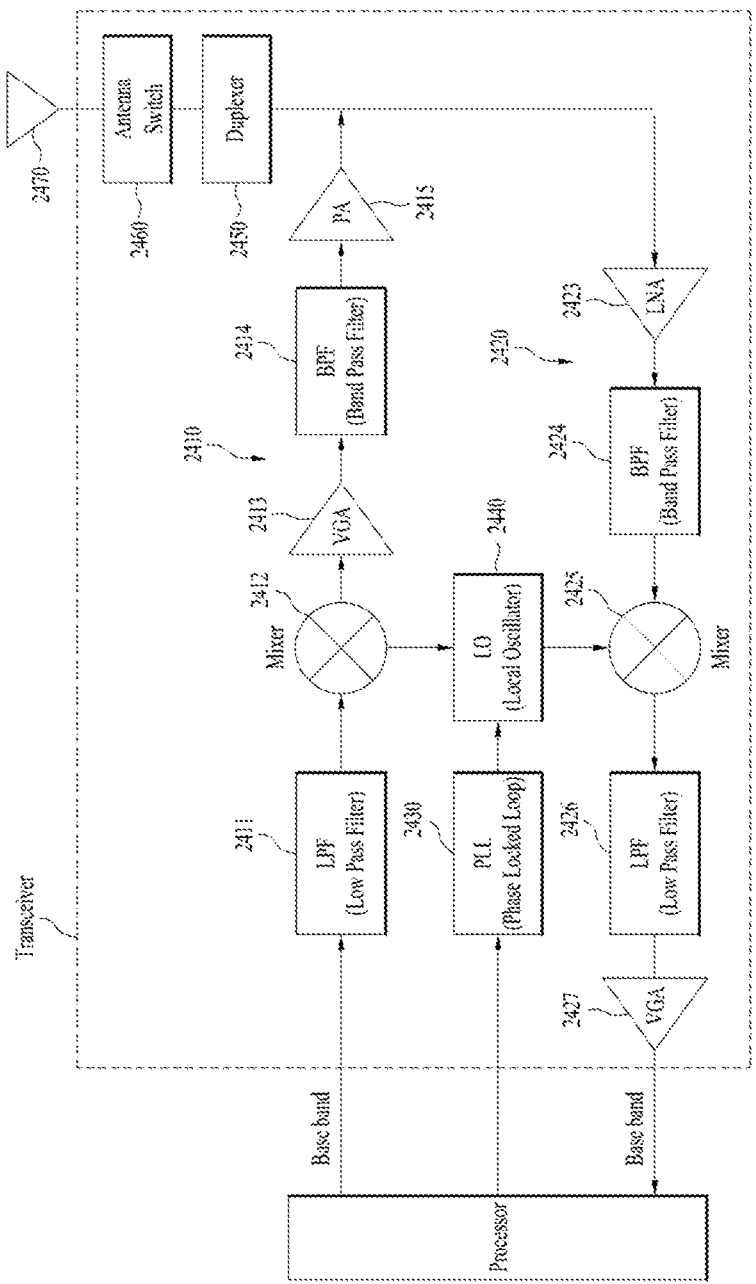
FIG. 23 shows an example of a transceiver of a wireless communication device according to some implementations of the present disclosure.

FIG. 23 is a block diagram schematically illustrating a transceiver of a wireless communication device according to an embodiment of the present disclosure.

Specifically, FIG. 23 shows an example of a transceiver capable of operating in an FDD system.

In the transmit path, at least one processor including the processors described in FIGS. 21 and 22 may be configured to process data to be transmitted and provide a signal such as an analog output signal to a transmitter 2410.

At the transmitter 2410, the analog output signal may be filtered by a low pass filter (LPF) 2411 (to remove artifacts caused by conventional analog-to-digital conversion (ADC)), up-converted from baseband to RF by an up-converter (e.g., mixer) 2412, and amplified a variable gain amplifier (VGA) 2413. The amplified signal may be filtered by a filter 2414, further amplified by a power amplifier (PA) 2415, routed through a duplexer 2450 and/or an antenna switch 2460, and transmitted on an antenna 2470.

In the receive path, the antenna 2470 may receive a signal from a wireless environment. The receive signal may be routed through the antenna switch 2460 and the duplexer 2450 and then provided to a receiver 2420.

At the receiver 2420, the received signal may be amplified by an amplifier such as a low noise amplifier (LNA) 2423, filtered by a band pass filter 2424, and down-converted from RF to baseband by a downconverter (e.g., mixer) 2425.

The down-converted signal may be filtered by an LPF 2426 and amplified by an amplifier such as a VGA 2427 to obtain an analog input signal. Then, the analog input signal may be provided to the processors in FIGS. 21 and 22.

Further, a local oscillator (LO) generator 2440 may generate and provide transmission and reception LO signals to the up-converter 2412 and the down-converter 2425, respectively.

The present disclosure is not limited to the configuration shown in FIG. 23, and various components and circuits may be arranged differently from the example shown in FIG. 23 to achieve the functions and effects according to the present disclosure.

Figure 24:
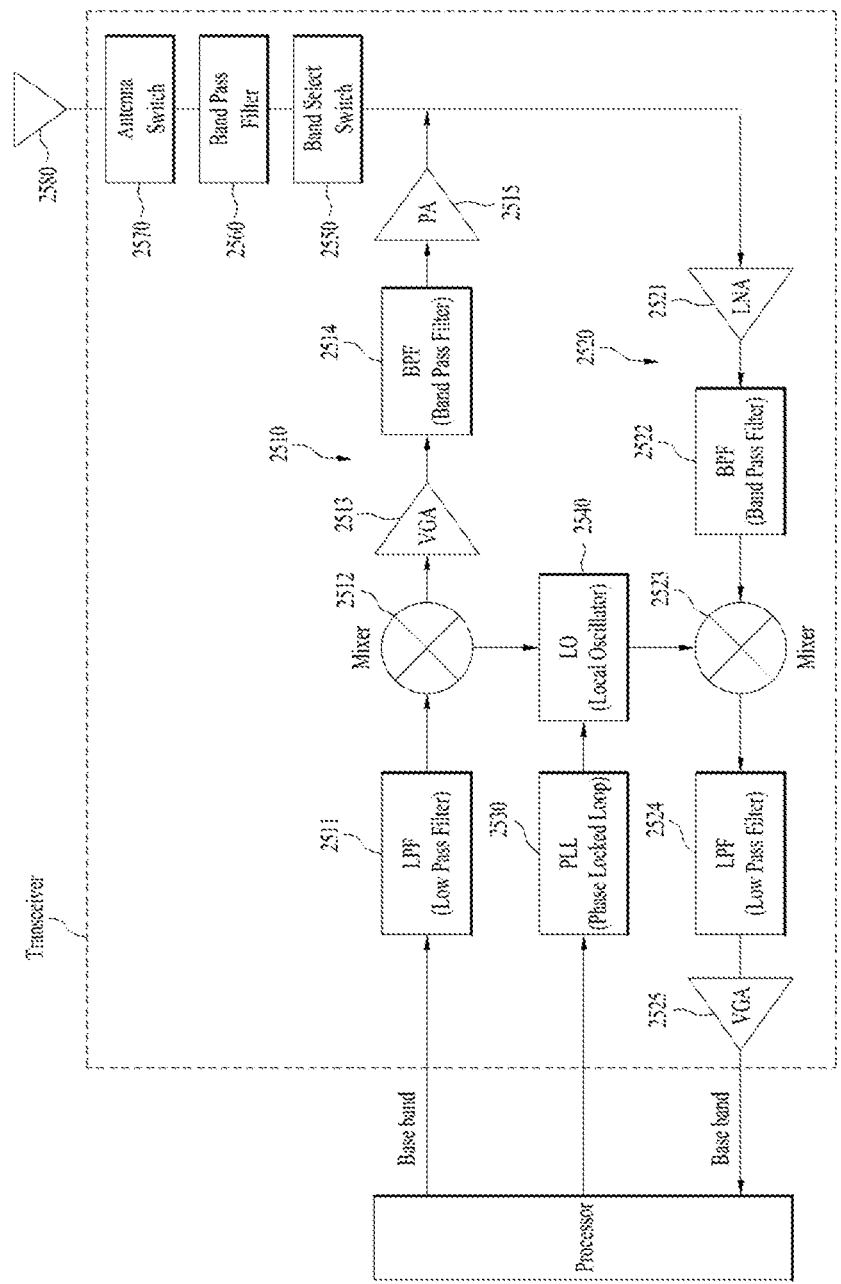
FIG. 24 shows another example of a transceiver of a wireless communication device according to some implementations of the present disclosure.

FIG. 24 illustrates another example of a transceiver of a wireless communication device according to an embodiment of the present disclosure.

Specifically, FIG. 23 shows an example of a transceiver capable of operating in a TDD system.

In some embodiments, a transmitter 2510 and a receiver 2520 included in the transceiver of the TDD system may have one or more features similar to those of the transmitter and the receiver included in the transceiver of the FDD system. Hereinafter, the structure of the transceiver of the TDD system will be described.

In the transmit path, a signal amplified by a power amplifier (PA) 2515 in the transmitter is routed through a band select switch 2550, a BPF 2560, and an antenna switch 2570 and transmitted on an antenna 2580.

In the receive path, the antenna 2580 may receive a signal from a wireless environment. The receive signal may be routed through the antenna switch(es) 2570, BPF 2560, and band select switch 2550 and provided to the receiver 2520.

Figure 25:
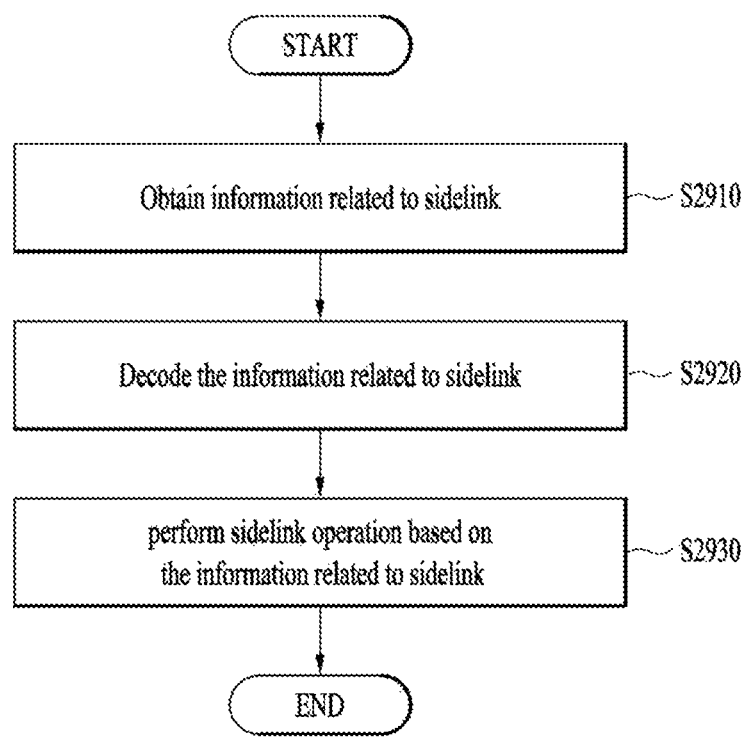
FIG. 25 is a flowchart for explaining sidelink operations of a wireless device.

FIG. 25 is a flowchart for explaining sidelink operations of a wireless device.

Referring to FIG. 25, the wireless device may obtain information related to a sidelink (S2910). The information related to the sidelink may include at least one resource configuration. The information related to the sidelink may be obtained from another wireless device or a network node.

After obtaining the information, the wireless device may decode the information related to the sidelink (S2920).

After decoding the information related to the sidelink, the wireless device may perform one or more sidelink operations based on the information related to the sidelink (S2930). Herein, the sidelink operation(s) performed by the wireless device may correspond to the one or more operations described in the flowchart.

The sidelink operations of the wireless device illustrated in FIG. 25 is merely exemplary, and the wireless device may perform sidelink operations based on various techniques. The sidelink may correspond to a UE-to-UE interface for sidelink communication and/or sidelink discovery. The sidelink may correspond to a PC5 interface as well. In a broad sense, a sidelink operation may mean information transmission/reception between UEs.

Figure 26:
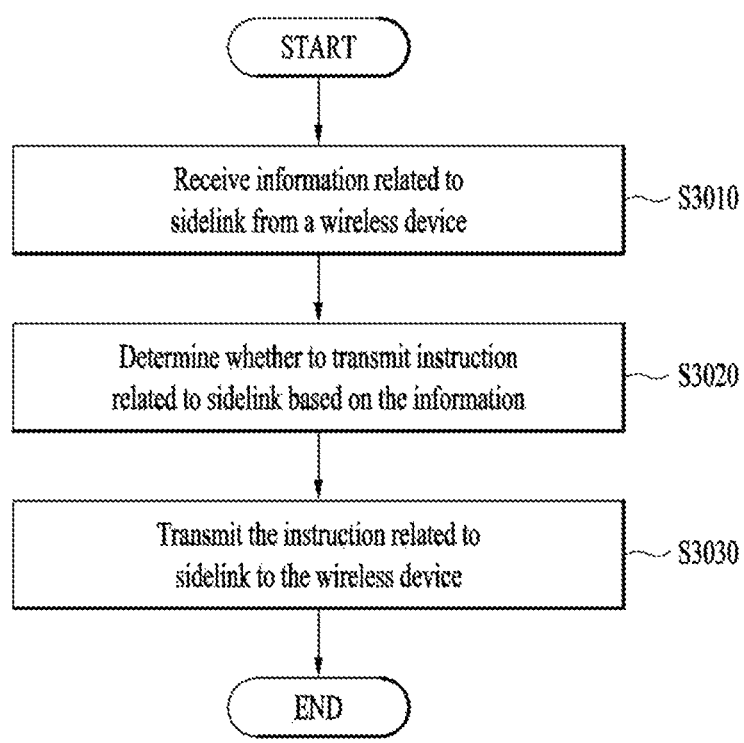
FIG. 26 is a flowchart for explaining sidelink operations of a network node.

FIG. 26 is a flowchart for explaining sidelink operations of a network node.

The sidelink operations of the network node illustrated in FIG. 26 is merely exemplary, and the network node may perform sidelink operations based on various techniques.

The network node may receive information related to a sidelink from a wireless device (S3010). For example, the information related to the sidelink may be 'SidelinkUEInformation' which is used to indicate sidelink information to a network node.

After receiving the information, the network node may determine whether to transmit one or more instructions related to the sidelink based on the received information (S3020).

When determining to transmit the instruction(s), the network node may transmit the sidelink-related instruction(s) to the wireless device (S3030). In some embodiments, after receiving the instruction(s) transmitted from the network node, the wireless device may perform one or more sidelink operations based on the received instruction(s).

Figure 27:
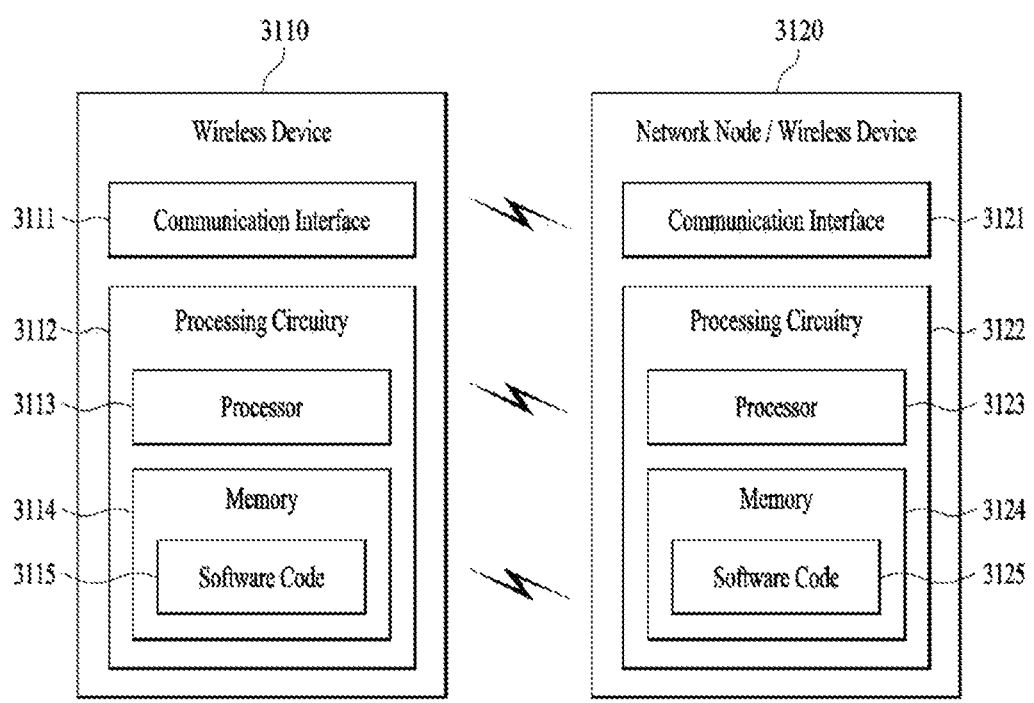
FIG. 27 is a block diagram illustrating an example of communications between a wireless device and a network node.

FIG. 27 is a block diagram schematically illustrating the configurations of a wireless device and a network node. A network node 3120 may be replaced with the wireless device or UE shown in FIG. 21.

For example, a wireless device 3110 may include a communication interface 3111 for communicating with one or more other wireless devices, network nodes, and/or other entities in the network. The communication interface 3111 may include one or more transmitters, one or more receivers, and/or one or more communications interfaces. The wireless device 3110 may include a processing circuitry 3112. The processing circuitry 3112 may include at least one processor such as a processor 3113 and at least one memory device such as a memory 3114.

The processing circuitry 3112 may be configured to control at least one of the above-described methods and/or processes and enable the wireless device 3110 to perform the methods and/or processes. The processor 3113 may correspond to one or more processors for performing the wireless device functions described herein. The wireless device 3110 may include a memory 3114 configured to store data, programmable software code, and/or other information described herein.

In some embodiments, the memory 3114 may be configured to store software code 3115 including instructions that allow at least one processor to perform some or all of the processes described above with reference to FIG. 25 or the methods described above in the embodiments.

For example, at least one process for transmitting and receiving information may be performed by the processor 3113 controlling the transceiver 2223 in FIG. 21 to transmit and receive the information.

The network node 3120 may include a communication interface 3121 for communicating with one or more other network nodes, wireless devices, and/or other entities in the network. The communication interface 3121 may include one or more transmitters, one or more receivers, and/or one or more communications interfaces. The network node 3120 may include a processing circuitry 3122. The processing circuitry 3122 may include a processor 3123 and a memory 3124.

For example, at least one process for transmitting and receiving information may be performed by the processor 3123 controlling the transceiver 2213 in FIG. 21 to transmit and receive the information.

The above-described embodiments of the present disclosure may be implemented through various means, for example, hardware, firmware, software, or a combination thereof.

In a hardware configuration, the methods according to the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. for performing the above-described functions or operations. Software code may be stored in a memory unit and executed by a processor. The memory unit may be located inside or outside the processor and exchange data with the processor via various known means.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of performing an operation related to observed time difference of arrival (OTDOA) by a user equipment (UE) in a wireless communication system, the method comprising:
   receiving, from a first base station, a first positioning signal including two reference signals having a first frequency interval;
   receiving, from a second base station, a second positioning signal including two reference signals having a second frequency interval;
   measuring a first phase difference between the two reference signals included in the first positioning signal;
   measuring a second phase difference between the two reference signals included in the second positioning signal;
   calculating a difference value between the first phase difference and the second phase difference; and
   reporting, to the first base station, the difference value instead of a value of a reference signal time difference (RSTD),
   wherein the difference value is reported to the first base station through transmission of a reference signal having a phase rotated by the difference value.

2. The method of claim 1, wherein the UE determines whether to apply a predetermined scale value to the difference value based on a magnitude of the difference value.

3. The method of claim 1, wherein the first phase difference and the second phase difference are preconfigured to any one of 90 KHz and 180 KHz.

4. The method of claim 1, wherein the predetermined first frequency interval is determined by a location server for estimating a location of the UE.

5. The method of claim 1, wherein the first frequency interval and the second frequency interval are preconfigured based on channel selectivity.

6. A device for performing an operation related to observed time difference of arrival (OTDOA) in a wireless communication system, the device comprising:
   a processor; and
   a memory storing instructions that, based on being executed by the processor, control the device to perform operations comprising:
   receiving, from a first base station, a first positioning signal including two reference signals having a first frequency interval;
   receiving, from a second base station, a second positioning signal including two reference signals having a second frequency interval;
   measuring a first phase difference between the two reference signals included in the first positioning signal;
   measuring a second phase difference between the two reference signals included in the second positioning signal;
   calculating a difference value between the first phase difference and the second phase difference; and
   reporting, to the first base station, the difference value instead of a value of a reference signal time difference (RSTD),
   wherein the difference value is reported to the first base station through transmission of a reference signal having a phase rotated by the difference value.

7. The device of claim 6, wherein the processor is configured to receive a user input to switch a drive mode from an autonomous mode to a manual mode, or to switch from a manual mode to an autonomous mode.

* * * * *